United States Patent
Maeda et al.

(10) Patent No.: US 7,418,248 B2
(45) Date of Patent: Aug. 26, 2008

(54) SIGNAL RECEPTION DEVICE, SIGNAL TRANSMISSION DEVICE, RADIO COMMUNICATION SYSTEM, AND SIGNAL RECEPTION METHOD

(75) Inventors: Koji Maeda, Yokosuka (JP); Satoru Fukumoto, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 445 days.

(21) Appl. No.: 11/111,942

(22) Filed: Apr. 22, 2005

(65) Prior Publication Data
US 2005/0245220 A1 Nov. 3, 2005

(30) Foreign Application Priority Data
Apr. 23, 2004 (JP) ............................. 2004-128832

(51) Int. Cl.
*H04B 1/06* (2006.01)
(52) U.S. Cl. .................. 455/203; 455/205; 455/260; 455/196.1; 455/306; 375/346; 375/367
(58) Field of Classification Search ................ 455/203, 455/205, 260, 196.1, 306; 375/346, 367
See application file for complete search history.

(56) References Cited

U.S. PATENT DOCUMENTS

| | | | | |
|---|---|---|---|---|
| 4,761,821 A | | 8/1988 | Mawhinney et al. | |
| 4,972,430 A | * | 11/1990 | Cantwell | 375/130 |
| 5,410,750 A | * | 4/1995 | Cantwell et al. | 455/306 |
| 5,748,686 A | * | 5/1998 | Langberg et al. | 375/367 |
| 5,828,954 A | * | 10/1998 | Wang | 455/260 |
| 6,463,266 B1 | * | 10/2002 | Shohara | 455/196.1 |
| 6,859,641 B2 | | 2/2005 | Collins et al. | |
| 6,904,110 B2 | * | 6/2005 | Trans et al. | 375/350 |
| 2004/0264548 A1 | | 12/2004 | Miyoshi et al. | |
| 2005/0190870 A1 | * | 9/2005 | Blount et al. | 375/346 |

FOREIGN PATENT DOCUMENTS

| | | |
|---|---|---|
| EP | 1 404 047 A2 A3 | 3/2004 |
| EP | 1 453 211 A2 A3 | 9/2004 |
| JP | 2000-252958 | 9/2000 |
| WO | WO 03/088539 A1 | 10/2003 |

* cited by examiner

*Primary Examiner*—Sanh D Phu
(74) *Attorney, Agent, or Firm*—Oblon, Spivak, McClelland, Maier & Neustadt, P.C.

(57) ABSTRACT

A signal reception device is disclosed that is able to improve interference cancellation capabilities even when signals having different center frequencies exist on the same frequency band. The signal reception device includes an interference suppression unit to generate replicas of plural signals in the received signal and separate the signals by suppressing interference signals. The interference suppression unit includes a signal phase rotator to rotate phases of the signal candidates at preset respective rotational frequencies, the preset rotational frequencies being related to respective center frequencies of the signals in the received signal; a rotational frequency controller to set the preset rotational frequencies; and a replica generator to generate the replicas of the signals by using the phase-rotated signal candidates.

15 Claims, 26 Drawing Sheets

SIGNAL RECEPTION DEVICE, SIGNAL TRANSMISSION DEVICE, RADIO COMMUNICATION SYSTEM, AND SIGNAL RECEPTION METHOD

BACKGROUND OF THE INVENTION

1. Field of the Invention

The present invention relates to a signal reception device, a signal transmission device, a radio communication system, and a signal reception method used in mobile wireless communications and fixed wireless communications.

2. Description of the Related Art

In a wireless communication system, in order to achieve efficient utilization of limited frequency resources, it is desirable that signals use the same frequency as much as possible. As achievement of research and development in response to this requirement, for example, an interference canceller is attracting attention as a technique able to increase capacity of a communication system.

FIG. 25 is a block diagram illustrating an example of a configuration of an interference canceller of the related art.

The interference canceller 200 as illustrated in FIG. 25, which is installed in a signal receiver of a wireless communication system, generates a received signal replica by combining the replicas of signals in a received signal, separates a desired signal from other signals (namely, interference signals), and extracts the desired signal. Such an interference canceller 200 is called "replica generation type interference canceller".

Below, operations of the replica generation type interference canceller 200 are described with reference to FIG. 25. For convenience of description, it is assumed that there are two received signals (signal SIG1 and signal SIG2).

In the replica generation type interference canceller 200, a channel estimator 218 estimates channel impulse responses of the signals in consideration of the time spread of transmission paths of the desired and the interference signals. Coefficient variable filters 214 and 215 generate the replica signals of the desired and interference signals for all possible symbol sequence candidates of the desired and the interference signals by taking convolution of the estimated channel impulse responses (estimated values of the channels) and the symbol sequence candidates. An adder 216 sums the signal replicas of the desired and the interference signals, and generates a received signal replica. A maximum likelihood sequence estimator 220 selects a symbol sequence candidate of the desired and the interference signals, whose received signal replica is the closest to the actually received signal, and outputs a symbol sequence candidate of the desired signal as the estimation result of the received signal, thus effectively canceling the interference signals.

By adaptively canceling the interference signals in the received signal in this way, it is possible for many signals to use the same frequency at the same time, and to improve frequency utilization efficiency.

Additionally, in Japanese Laid Open Patent Application No. 2000-252958, it is proposed to estimate characteristics of channels in each path corresponding to a user so as to compensate for phases of signals, and to cancel interference by using the compensated signals.

With this technique, by using a frequency offset estimated at a final stage, it is possible to precisely estimate characteristics of channels, and as a result, it is possible to improve quality of demodulated data.

However, although the above interference cancellers of the related art are capable of effectively suppressing interference signals by generating the desired and the interference signal replicas, when center frequencies of the desired and the interference signals are different, it is observed that signals at the receiver after detection rotate at high speeds.

FIG. 26 is a diagram illustrating a problem of the related art when signals having different center frequencies are superposed on the same frequency for transmission.

In FIG. 26, it is assumed that a transmission device T1 and a reception device R1 communicate with each other, and the transmission device T1 transmits a wide band signal SIG1 having a center frequency $f_{c1}$ and a bandwidth $BW_1$. In addition, it is assumed that a transmission device T2 and a reception device R2 communicate with each other, and the transmission device T2 transmits a narrow band signal SIG2 having a center frequency $f_{c2}$ and a bandwidth $BW_2$. Under these conditions, focusing on signals received by the reception device R1, as shown in FIG. 26, the reception device R1 receives not only the wide band signal SIG1 from the transmission device T1, but also the narrow band signal SIG2 from the transmission device T2. In other words, as illustrated in the upper part of a portion (a) of FIG. 26, signals having different center frequencies exist on the same frequency band. If these received signals are expanded in an IQ plane, as illustrated in the lower part of the portion (a) of FIG. 26, it is observed that the received signal rotates at high speeds corresponding to the difference of the center frequencies. As a result, when the interference cancellers of the related art are used in such an environment, the channel estimation algorithm cannot follow the high speed rotation, resulting in great degradation of performance in the interference cancellation.

Further, for wireless signals partially sharing or completely sharing the same frequency, if the bandwidths of the wireless signals are different from each other, the difference of the center frequencies of the desired and the interference signals is the major cause of the great degradation of performance in interference cancellation.

SUMMARY OF THE INVENTION

Accordingly, it is a general object of the present invention to solve one or more problems of the related art.

A more specific object of the present invention is to provide a signal reception device, a signal transmission device, a radio communication system, and a signal reception method able to improve capability in interference cancellation even when signals having different center frequencies exist on the same frequency band.

According to a first aspect of the present invention, there is provided a signal reception device, comprising an interference suppression unit configured to generate replicas of plural signals in a received signal and separate the signals by suppressing interference signals, wherein the interference suppression unit includes: a signal phase rotator configured to rotate phases of the signals in the received signal at predetermined respective rotational frequencies, said predetermined rotational frequencies being related to respective frequencies of the received signals; a rotational frequency controller configured to set the predetermined rotational frequencies; and a replica generator configured to generate the replicas of the signals in the received signal by using the phase-rotated signal candidates rotated by the signal phase rotator.

As an embodiment, the interference suppression unit includes a frequency difference detector configured to detect frequency differences between center frequencies of the signals in the received signal and a detection reference frequency; and the rotational frequency controller controls the predetermined rotational frequencies so as to be equal to the frequency differences detected by the frequency difference detector.

As an embodiment, the interference suppression unit includes: a channel estimator configured to estimate the channel impulse responses of the signals in the received signal; and a frequency offset estimator configured to estimate frequency offsets between the predetermined rotational frequencies and the frequency differences.

As an embodiment, the frequency difference detector adjusts the frequency differences detected by the frequency difference detector so that the mean square values of the frequency offsets becomes a predetermined value.

As an embodiment, the rotational frequency controller changes the rotational frequencies; and the frequency difference detector detects the frequency differences by searching for rotational frequencies that cause the frequency offsets to be a predetermined value.

As an embodiment, the rotational frequency controller changes the rotational frequencies; and the frequency difference detector detects the frequency differences by searching for the rotational frequencies that causes a mean square value of the residual signal, which is obtained by subtracting the replica signals generated by the replica generators from the received signal, to be a predetermined value.

As an embodiment, the interference suppression unit includes a signal separator configured to separate a received signal into a data signal and the information of the center frequencies or the carrier frequencies of signals transmitted from signal transmission devices, and extract the information of the center frequencies; and the frequency difference detector detects the information of the center frequencies or the carrier frequencies separated by the signal separator, and calculates frequency differences between the center frequencies or the carrier frequencies and the detection reference frequency.

As an embodiment, the interference suppression unit includes a frequency information storage unit configured to store values of the center frequencies to be used by signal transmission devices; the frequency information storage unit selects one of the stored values of the center frequencies; and the frequency difference detector calculates a frequency difference between the selected value of the stored center frequencies and the detection reference frequency.

As an embodiment, the interference suppression unit includes a rotation speed detector configured to detect the phase rotation speed of the estimated channel impulse responses of the signals in the received signal; and the frequency information storage unit selects the selected value of the center frequencies again when the rotation speed is higher than a predetermined value.

As an embodiment, the frequency information storage unit selects the selected value of the center frequencies again depending on whether the detected rotation speed is positive or negative.

As an embodiment, the frequency difference detector extracts the information of the center frequencies or carrier frequencies of signals transmitted from signal transmission devices, and detects frequency differences between the center frequencies or the carrier frequencies and the detection reference frequency when varying the rotational frequencies in a predetermined range around the center frequency or the carrier frequency.

As an embodiment, the interference suppression unit includes a reception quality estimator configured to estimate the reception quality of the signals in the received signal; and the frequency difference detector sequentially detects the frequency differences between the center frequencies and the detection reference frequency based on the estimated reception quality of each signal in the received signal.

According to a second aspect of the present invention, there is provided a signal transmission device, comprising a frequency information generation unit configured to generate information of the center frequency or the carrier frequency of a transmission signal; and a frequency information transmission unit configured to include the generated information of the center frequency or the carrier frequency in a predetermined signal, and transmit the predetermined signal to a signal reception device.

As an embodiment, the predetermined signal is transmitted through channels common to the signal transmission device and other signal transmission devices, said signal transmission device and other signal transmission devices sharing a part of or the whole frequency band.

According to a third aspect of the present invention, there is provided a wireless communication system, comprising a plurality of signal transmission devices; and a plurality of signal reception devices communicating with the signal transmission devices; wherein the signal transmission devices generate predetermined signals including the information of the center frequencies or the carrier frequencies of each signal, and transmit the predetermined signals; each of the signal reception devices includes an interference suppression unit configured to generate replicas of plural signals in the received signal and separate the signals by suppressing interference signals; the interference suppression unit includes a replica generator configured to generate replicas of the signal in the received signal by using the center frequencies or carrier frequencies, whose information is extracted from the predetermined signal; and the signal reception devices separate the signals in the received signal by using the replica signal generated by the replica generator.

According to a fourth aspect of the present invention, there is provided a signal reception method for suppressing interference signals by generating replica of the signals in the received signal and separating the signals when demodulating the received signal, said method comprising the steps of: rotating the phases of signal candidates at the predetermined rotational frequencies, said predetermined rotational frequencies being related to respective center frequencies or carrier frequencies of the signals in the received signal; generating the replica signals by using the phase-rotated signal candidates; and separating the signals in the received signal using the generated replica signals.

According to the present invention, because the replicas of signals in the received signal having different center frequencies are generated, even for the interference signals having different center frequencies, the channel estimation algorithm is capable of following the high speed rotation due to the frequency offset between the center frequencies and the detection reference frequency; hence, it is possible to use signals having different center frequencies on the same frequency band. Therefore, even when plural signals having different center frequencies exist on the same frequency band, it is possible to separate and extract these signals, and improve capability in interference cancellation.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

In the following embodiments, replicas are generated accurately while considering differences of frequencies of signals in a received signal, for example, considering the differences of center frequencies or carrier frequencies.

First Embodiment

Figure 1:
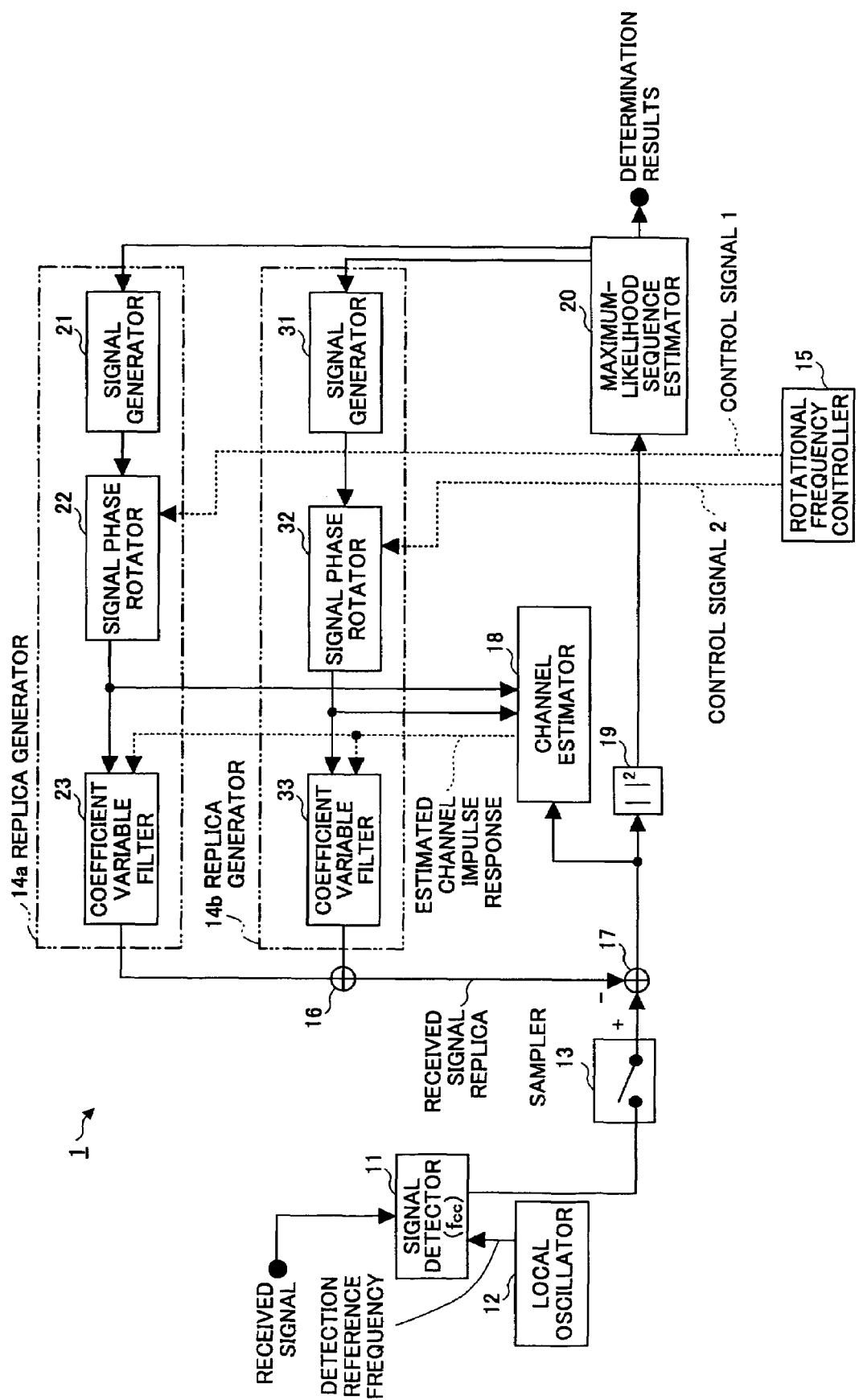
FIG. 1 is a block diagram showing a configuration of a signal reception device 1 used in a wireless communication system according to a first embodiment of the present invention.

FIG. 1 is a block diagram showing a configuration of a signal reception device 1 used in a wireless communication system according to a first embodiment of the present invention.

As illustrated in FIG. 1, the signal reception device 1 includes a signal detector 11, a local oscillator 12, a sampler 13, replica generators 14a, 14b, a rotational frequency controller 15, an adder 16, a subtraction section 17, a channel estimator 18, a squaring section 19, and a maximum likelihood sequence estimator 20.

The replica generator 14a includes a signal generator 21, a signal phase rotator 22, and a coefficient variable filter 23.

The replica generator 14b includes a signal generator 31, a signal phase rotator 32, and a coefficient variable filter 33.

The signal detector 11, the local oscillator 12, the sampler 13, the replica generators 14a, 14b, the rotational frequency controller 15, the adder 16, the subtraction section 17, the channel estimator 18, the squaring section 19, and the maximum likelihood sequence estimator 20 function as an interference canceller in the claims.

Below, operations of the signal reception device 1 are described. For convenience of description, it is assumed that the received signal includes two components SIG1 and SIG2.

In FIG. 1, the signal reception device 1 receives a signal, which includes plural signals from a number of transmission devices, the received signal is detected by the signal detector 11. Here, the received signal includes plural signal components (here, the signal SIG1 and the signal SIG2) which have different center frequencies.

The local oscillator 12 generates a reference signal having a detection reference frequency $f_{cc}$ and inputs this reference signal to the signal detector 11 for signal detection.

The received signal, which is detected by the signal detector 11, is input to the subtraction section 17 through the sampler 13. The subtraction section 17 subtracts a received signal replica from samples output by the sampler 13, and outputs the result as an error signal to the channel estimator 18 and the squaring section 19.

The maximum likelihood sequence estimator 20 outputs respective symbol sequence candidates of the signal SIG1 and the signal SIG2 to the signal generators 21 and 31, respectively.

The signal generator 21 and the signal generator 31 modulate the symbol sequence candidates, and output the modulated symbol sequence candidates to the signal phase rotators 22 and 32, respectively, as signal candidates in a signal space.

The signal phase rotators 22 and 32 rotate phases of the signal candidates according to a control signal output from the rotational frequency controller 15. The control signal is related to a rotational frequency.

For example, if the rotational frequency is $\Delta f_c$, the phase of a signal candidate is rotated at the angular velocity of $2\pi\Delta f_c$. Detailed descriptions are below.

Figure 2:
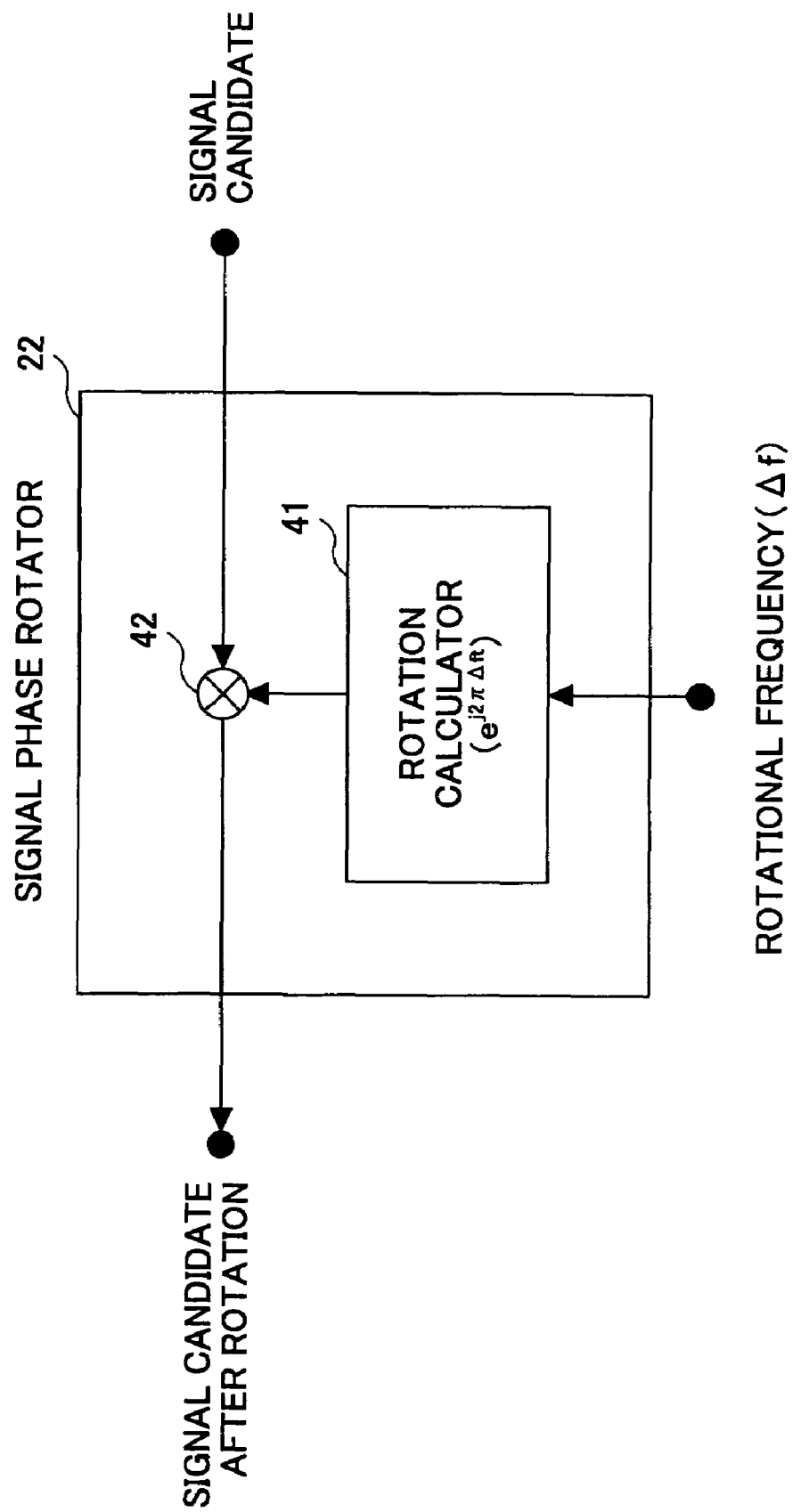
FIG. 2 is a block diagram illustrating a configuration of the signal phase rotator 22 or 32 in the first embodiment.

FIG. 2 is a block diagram illustrating a configuration of the signal phase rotator 22 or 32 in the present embodiment.

As illustrated in FIG. 2, the signal phase rotator 22 includes a rotation calculator 41 and a multiplier 42.

The signal phase rotator 22 calculates a value of phase rotation at time t, which equals $2\pi\Delta f_c t$, and the multiplier 42 multiplies the signal candidates output from the signal generators 21a and 21b by $e^{j2\pi\Delta fct}$, and phase-rotated signal candidates are obtained.

Operations of the signal phase rotator 32 are the same as those of the signal phase rotator 22, as described above.

In the present embodiment, it is assumed that the rotational frequency controller 15 stores information of the rotational frequencies $\Delta f_1$, and $\Delta f_2$ corresponding to the signals SIG1 and SIG2 in a memory in advance. The rotational frequency controller 15 reads out the information of the rotational frequencies $\Delta f_1$ and $\Delta f_2$ from the memory at predetermined timings, inserts the information of the rotational frequencies $\Delta f_1$ and $\Delta f_2$ into the control signal, and outputs the control signal to the signal phase rotators 22 and 32.

For example, the information of the rotational frequencies $\Delta f_1$ and $\Delta f_2$ stored in the memory of the rotational frequency controller 15 is transmitted to the signal reception device 1 through a cable network, or a wireless network.

The phase-rotated signal candidates generated by the signal phase rotators 22, 32 are input to the coefficient variable filters 23, 33, and the channel estimator 18.

The coefficient variable filters 23, 33 set filter coefficients according to estimated channel impulse responses obtained by the channel estimator 18, and output replica signals, which include delayed waves and involve a time spread.

The squaring section 19 calculates the square of the difference between the received signal replica and the sample of the received signal, and outputs the result to the maximum likelihood sequence estimator 20.

With the square of the difference between the received signal replica and the sample of the received signal as a reference, the maximum likelihood sequence estimator 20 selects the symbol sequence candidate of the signal SIG1 and signal SIG2, whose received signal replica is the closest to the actually received signal, as the decision symbol sequences, and outputs the decision result.

The channel estimator 18 successively estimates the transmission channels by using the phase-rotated signal candidates generated by the signal phase rotators 22, 32, and the difference between the received signal replica and the sample of the received signal.

According to the present embodiment, the signal phase rotator rotates the phase of signals, which are output from the signal generator, at the rotational frequency specified by the rotational frequency controller, and the coefficient variable filter generates replica signals having different center frequencies by using the phase-rotated signal candidates. Hence, it is possible to easily generate replicas even when signals having different center frequencies share a part of a frequency band or the same frequency band, and the detected signals rotate in phase at high speeds. As a result, it is possible to improve the capability in interference cancellation without loss of tracking capability of a channel estimation algorithm.

Second Embodiment

Figure 3:
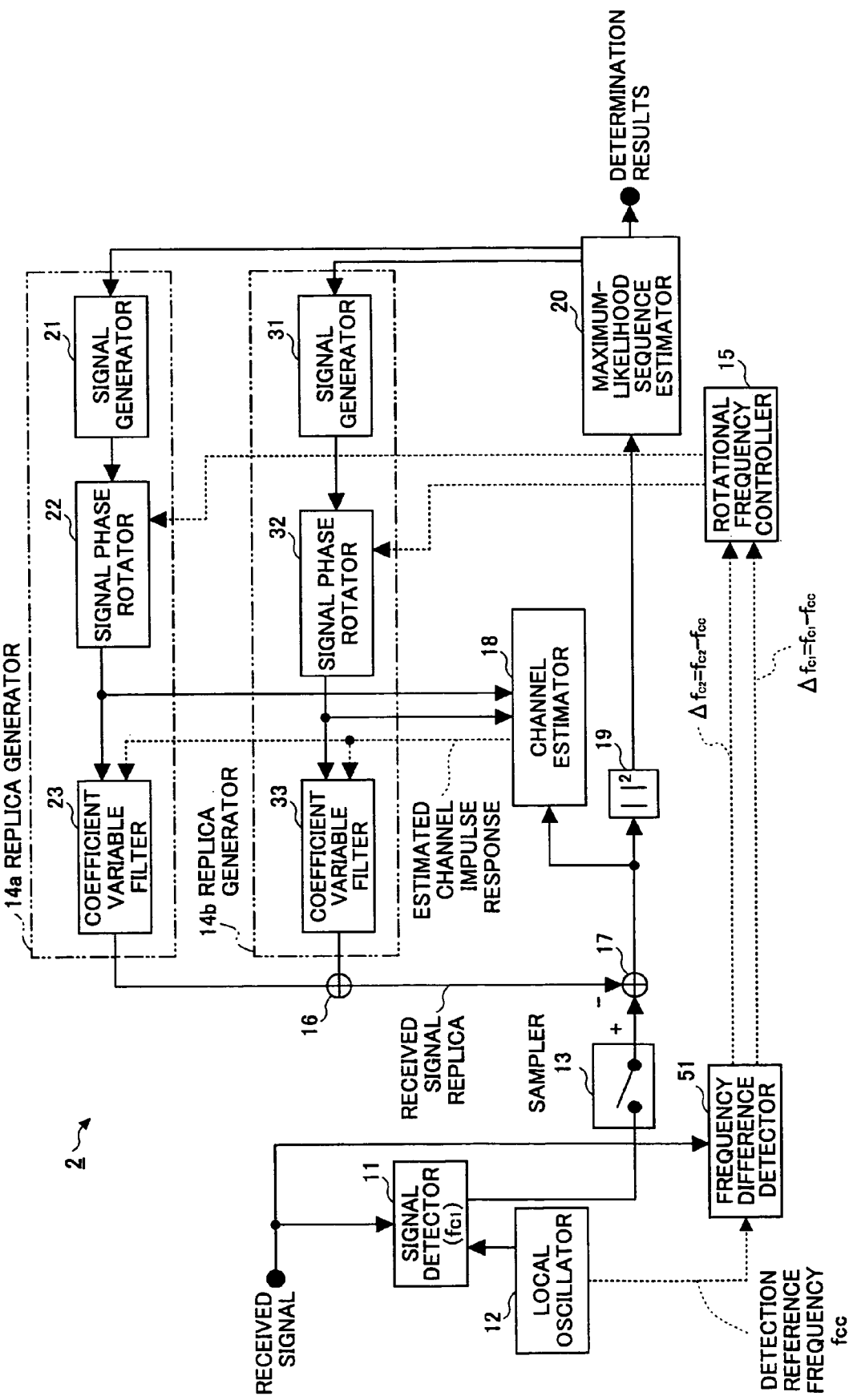
FIG. 3 is a block diagram showing a configuration of a signal reception device 2 according to a second embodiment of the present invention.

FIG. 3 is a block diagram showing a configuration of a signal reception device 2 according to a second embodiment of the present invention.

The signal reception device 2 of the present embodiment includes a frequency difference detector 51 in addition to the configuration of the signal reception device 1 in FIG. 1.

As illustrated in FIG. 3, a received signal, which includes plural signal components (here, the signal SIG1 and the signal SIG2) which have different center frequencies, is input to the signal detector 11 and the frequency difference detector 51.

The local oscillator 12 generates a reference signal having a detection reference frequency $f_{cc}$ and inputs this reference signal to the signal detector 11 and the frequency difference detector 51.

The received signal detected by the signal detector 11 is input to the subtraction section 17 through the sampler 13. The subtraction section 17 subtracts a received signal replica from samples output by the sampler 13, and outputs the result as an error signal to the channel estimator 18 and the squaring section 19.

The maximum likelihood sequence estimator 20 outputs respective symbol sequence candidates of the signal SIG1 and the signal SIG2 to the signal generators 21 and 31, respectively.

The signal generators 21 and 31 modulate the symbol sequence candidates as signal candidates in the signal space, and output the modulated symbol sequence candidates to the signal phase rotators 22 and 32, respectively.

From the input signal and the detection reference frequency $f_{cc}$ in the signal detector 11 and by using the following equations (1a, 1b), the frequency difference detector 51 calculates frequency differences ($\Delta f_{c1}$, $\Delta f_{c2}$) between the center frequencies ($f_{c1}$, $f_{c2}$) of the signals SIG1 and SIG2 and the detection reference frequency $f_{cc}$, and the obtained frequency differences ($\Delta f_{c1}$, $\Delta f_{c2}$) are input to the rotational frequency controller 15.

$$\Delta f_{c1} = f_{c1} - f_{cc} \tag{1a}$$

$$\Delta f_{c2} = f_{c2} - f_{cc} \tag{1b}$$

The rotational frequency controller 15 inserts information of the frequency differences ($\Delta f_{c1}$, $\Delta f_{c2}$) into the control signal as information of the rotational frequencies $\Delta f_1$ and $\Delta f_2$, and outputs the control signal to the signal phase rotators 22 and 32.

The signal phase rotators 22 and 32 extract the rotational frequencies from the control signal, and rotate phases of the signal candidates according to the extracted rotational frequencies.

For example, with a frequency difference of $\Delta f_c$, the phase of a signal candidate is rotated at an angular velocity of $2\pi\Delta f_c$.

The phase-rotated signal candidates generated by the signal phase rotators 22, 32 are input to the coefficient variable filters 23, 33, and the channel estimator 18.

The coefficient variable filters 23, 33 set filter coefficients according to estimated channel impulse responses obtained by the channel estimator 18, and output replica signals, which include delayed waves and involve a time spread.

With a reference signal to be the square of the difference between a sample of the received signal output from the sampler 13 and the received signal replica obtained by summation of replica signals generated by the coefficient variable filters 23, 33 in the adder 16, the maximum likelihood sequence estimator 20 selects the symbol sequence candidate of the signal SIG1 and signal SIG2, whose received signal replica is the closest to the actually received signal, as the decision symbol sequences, and outputs the decision result.

The channel estimator 18 successively estimates the transmission channels by using the phase-rotated signal candidates from the signal phase rotators 22, 32, and the difference between the received signal replica and the sample of the received signal.

According to the present embodiment, the signal phase rotator rotates the phase of the signal candidates according to the frequency differences between the center frequencies of the signals SIG1 and SIG2 and the detection reference frequency; hence, it is possible to precisely estimate the transmission channels even when the frequency differences are large, and the detected signals rotate in phase at high speeds. That is, by considering differences of the center frequencies of signals in the received signal, which is detected at a predetermined detection reference frequency, it is possible to precisely generate replicas, and to improve interference cancellation performance.

Third Embodiment

In the present embodiment, with the detection reference frequency as the predetermined frequency, the frequency difference detector 51 detects a frequency difference. In the present embodiment, the detection reference frequency is set to be in agreement with a center frequency ($f_{c1}$) of the signal SIG1.

Figure 4:
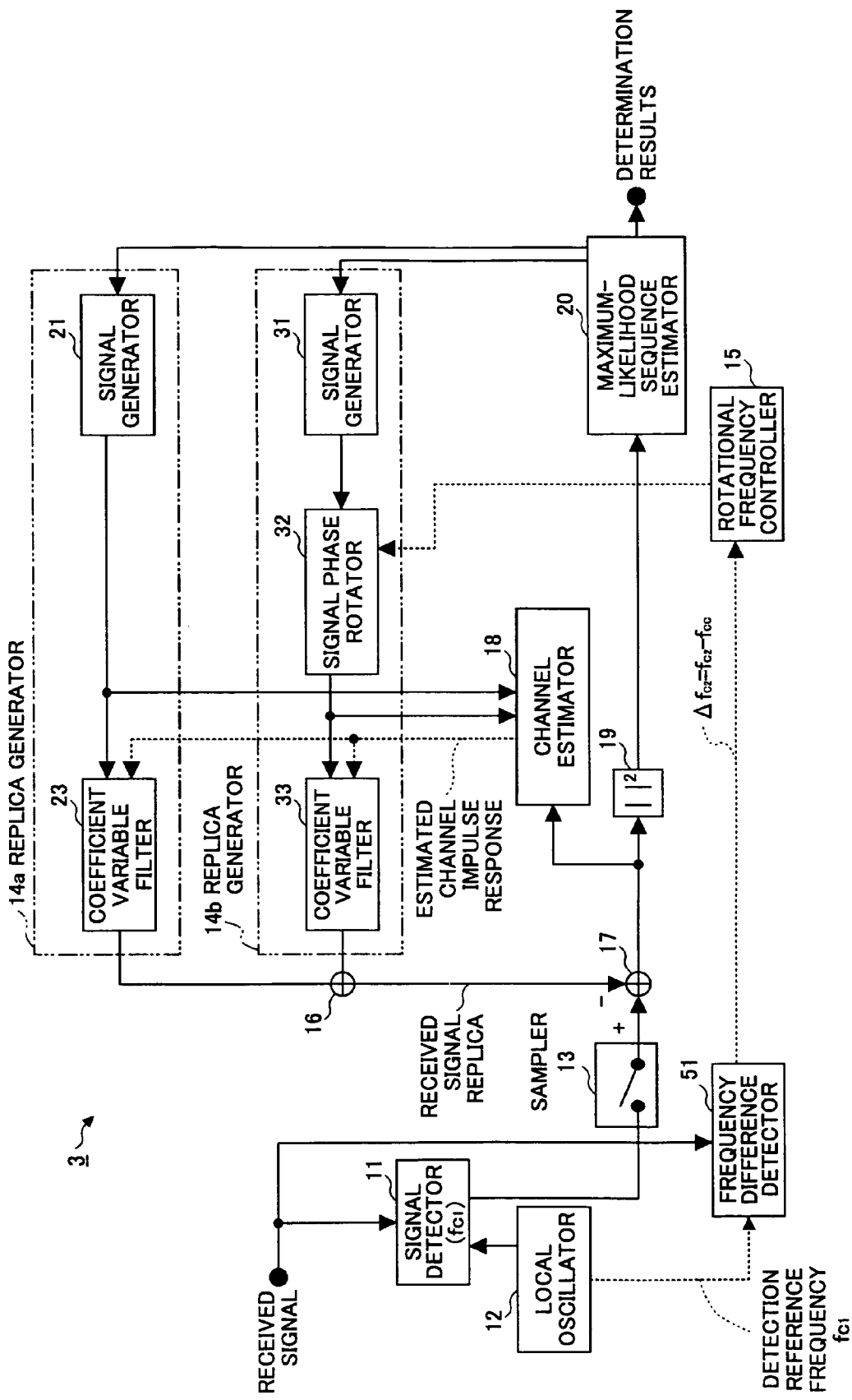
FIG. 4 is a block diagram showing a configuration of a signal reception device 3 according to a third embodiment of the present invention.

FIG. 4 is a block diagram showing a configuration of a signal reception device 3 according to a third embodiment of the present invention.

Compared to the signal reception device in FIG. 3, the signal phase rotator 22 of the replica generators 14a is omitted.

In the present embodiment, the same reference numbers are assigned to the same elements as those illustrated in FIG. 1, and overlapping descriptions are omitted.

As illustrated in FIG. 4, from the input signal and the detection reference frequency $f_{c1}$ in the signal detector 11 and by using the following equation (2), the frequency difference detector 51 calculates a frequency difference ($\Delta f_{c2}$) between the center frequency of the signal SIG2 and the detection reference frequency, which is the center frequency of the signal SIG1, and the obtained frequency difference is input to the rotational frequency controller 15.

$$\Delta f_{c2} = f_{c2} - f_{c1} \tag{2}$$

In this case, because the detection reference frequency is set to be the center frequency of the signals SIG1, the frequency difference for signal SIG1 is zero; hence it is not necessary to rotate the signal, and the signal phase rotator 22, in FIG. 1, can be omitted.

According to the present embodiment, in addition to the effects of the second embodiment, the structure of the replica generation circuit can be simplified, and capability in interference cancellation can be improved.

Fourth Embodiment

Figure 5:
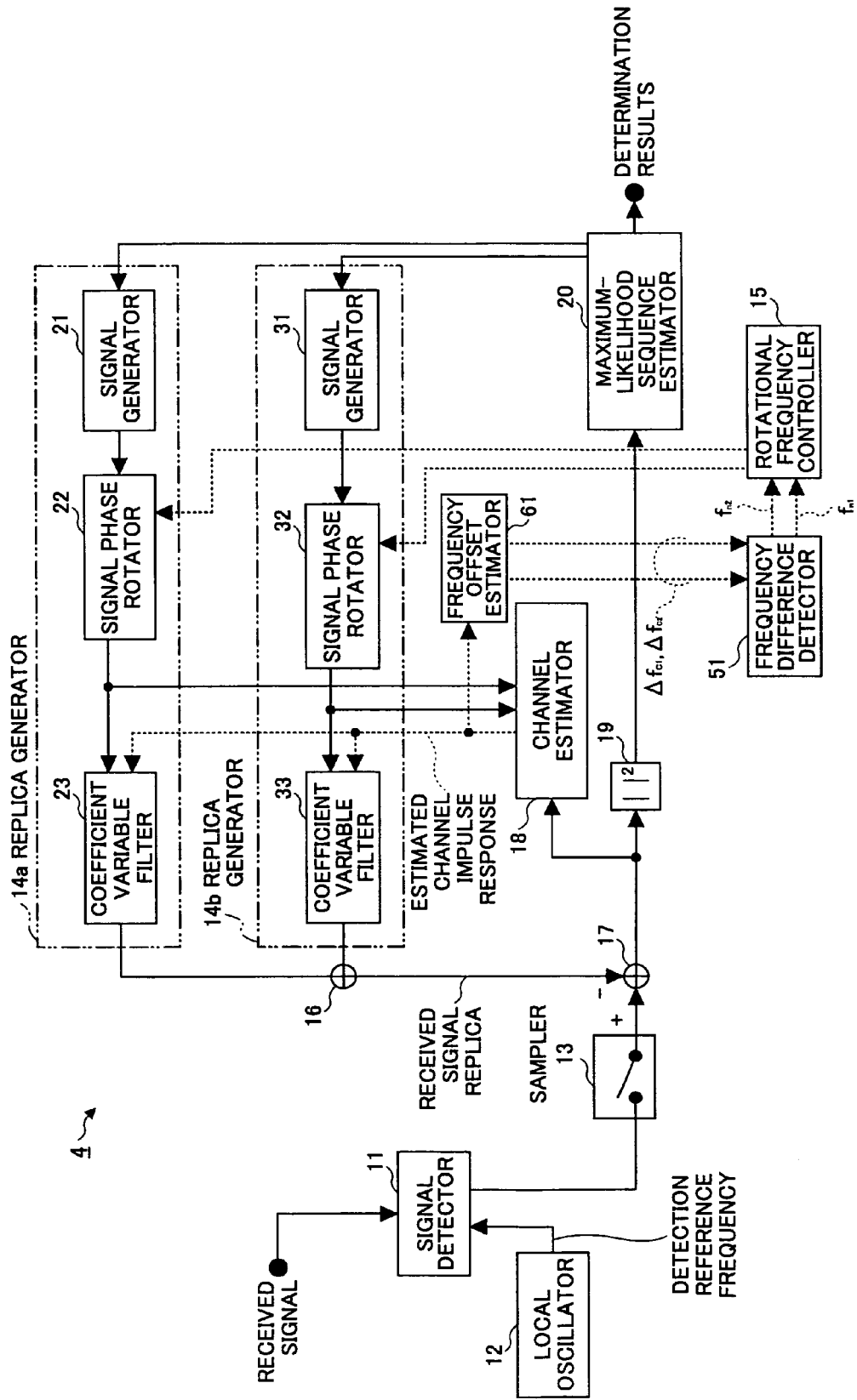
FIG. 5 is a block diagram showing a configuration of a signal reception device 4 according to a fourth embodiment of the present invention.

FIG. 5 is a block diagram showing a configuration of a signal reception device 4 according to a fourth embodiment of the present invention.

Compared to the signal reception device in FIG. 3, the signal reception device 4 includes an additional frequency offset estimator.

In the present embodiment, the same reference numbers are assigned to the same elements as those illustrated in FIG. 1, and overlapping descriptions are omitted.

As illustrated in FIG. 5, the signal detector 11 in the signal reception device 1 receives a signal from a number of transmission devices, and the received signal includes plural signal components (here, the signal SIG1 and the signal SIG2) having different center frequencies.

The local oscillator 12 generates a reference signal having a detection reference frequency and inputs this reference signal into the signal detector 11.

The received signal detected by the signal detector 11 is input to the subtraction section 17 through the sampler 13. The subtraction section 17 subtracts a received signal replica from samples output by the sampler 13, and outputs the result as an error signal to the channel estimator 18 and the squaring section 19.

The channel estimator 18 successively estimates the transmission channels by using the phase-rotated signal candidates from the signal phase rotators 22, 32, and the difference between the received signal replica and the sample of the received signal, and outputs the estimated channel impulse responses to the coefficient variable filters 23, 33 and an frequency offset estimator 61. For example, if the frequency difference between the center frequency of a signal and the detection reference frequency is $\Delta f_c$, the estimated channel impulse response is rotated with an angular velocity $2\pi\Delta f_c$, caused by the frequency difference, in addition to a fading channel.

In the signal phase rotators 22, 32, even when the phase of a signal candidate is rotated at an angular velocity of $2\pi f_n$, the transmission channel is estimated to include rotation at an angular velocity of $2\pi(\Delta f_c - f_n)$.

In the present embodiment, the frequency offset detector 61 observes the rotational speed of the phase rotation of the signal from the above estimated channel impulse responses, and calculates, a frequency offset, which equals the difference between the center frequency of the signal and the frequency detected by the frequency difference detector 51, from the rotational speed.

Specifically, the frequency offset detector 61 observes the rotational speed of the signal phase, and calculates the frequency offset ($\delta f$) by using the following equation (3).

$$\delta f = Q_R / (2\pi T) \tag{3}$$

where, T represents an observation time period, and $Q_R$ represents a total phase rotation within the observation time period T.

The frequency difference detector 51 receives the frequency offsets ($\delta f_{c1}$, $\delta f_{c2}$) calculated by the frequency offset detector 61, and adjusts the frequency differences ($\Delta f_{c1}$, $\delta f_{c2}$) by using adaptive algorithms so that the mean square error of the frequency offsets ($\delta f_{c1}$, $\delta f_{c2}$) becomes a predetermined value, and preferably, becomes a small value.

Below, the adaptive algorithm is described with reference to FIG. 6.

Figure 6:
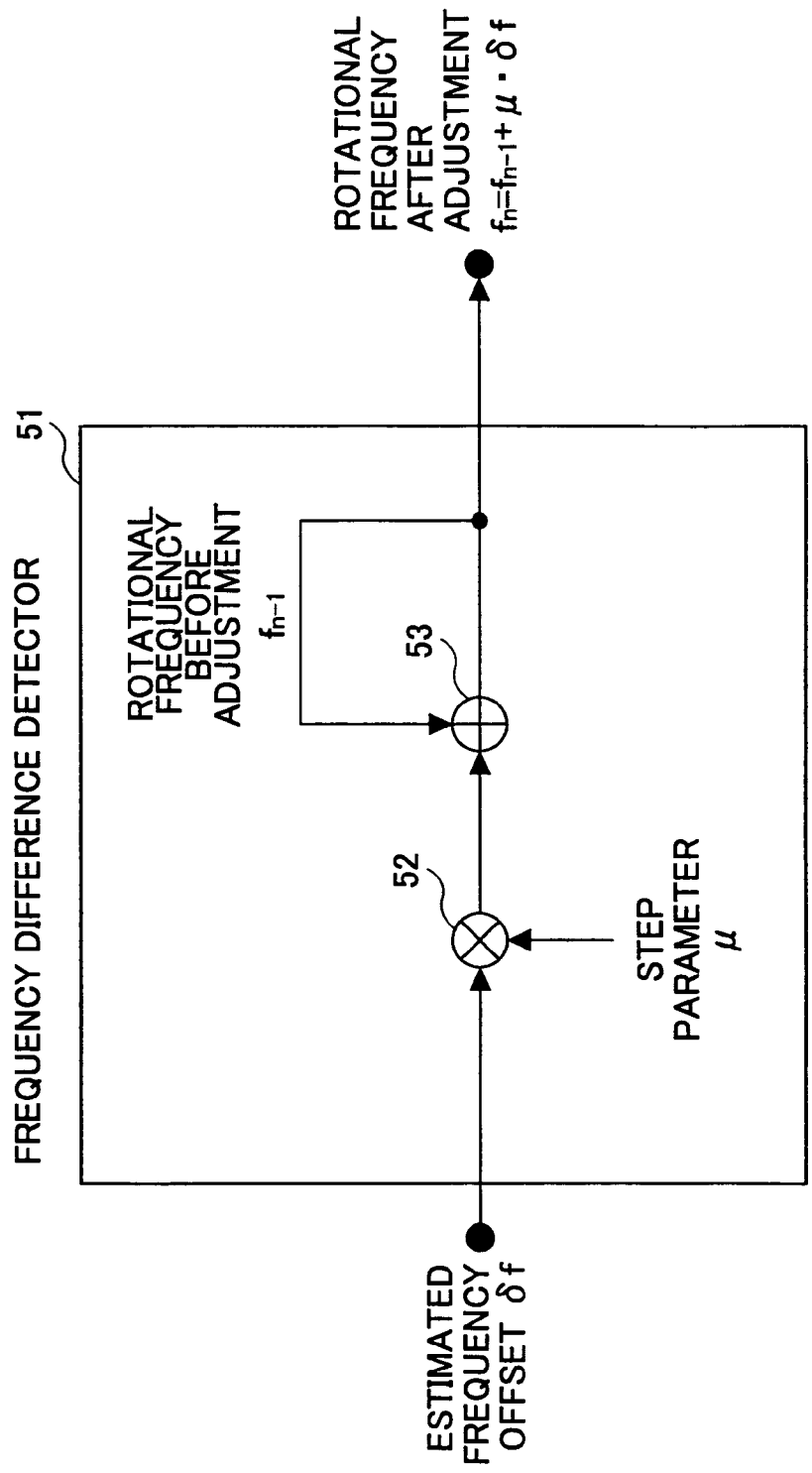
FIG. 6 is a block diagram showing a configuration of the frequency difference detector 51 according to the fourth embodiment.

FIG. 6 is a block diagram showing a configuration of the frequency difference detector 51 according to the present embodiment.

In FIG. 6, the frequency difference detector 51 uses the LMS (Least Mean Squares) algorithm. Here, it is assumed that a frequency difference detected at a certain time is $f_{n-1}$.

As illustrated in FIG. 6, once the frequency difference detector 51 receives an estimated frequency offset $\Delta f$ given by the frequency offset detector 61, a multiplier 52 multiplies the estimated frequency offset Δf by a step parameter μ. Here, step parameter μ can be any sufficiently small positive number, that is, $$0<\mu<<1.$$

Next, an accumulator 53 adds the frequency difference $f_{n-1}$, detected at a certain time to the multiplication result of multiplier 52 (μΔf) to find the frequency difference $f_n$ at a next time. In doing so, it is possible to adaptively estimate the frequency differences with a small mean square error and a high accuracy.

Returning to FIG. 5 and continuing the descriptions, the frequency difference detector 51 inputs the thus adjusted frequency differences $f_{n1}$, $f_{n2}$ to the rotational frequency controller 15.

The maximum likelihood sequence estimator 20 outputs respective symbol sequence candidates of the signal SIG1 and the signal SIG2 to the signal generators 21 and 31, respectively.

The signal generator 21 and the signal generator 31 modulate the symbol sequence candidates, and output the modulated symbol sequence candidates to the signal phase rotators 22 and 32 as signal candidates in the signal space.

The signal phase rotators 22 and 32 rotate phases of the signal candidates according to a control signal output from the rotational frequency controller 15, which is related to a rotational frequency.

The phase-rotated signal candidates generated by the signal phase rotators 22, 32 are input to the coefficient variable filters 23, 33, and the channel estimator 18.

The coefficient variable filters 23, 33 set filter coefficients according to estimated channel impulse responses obtained by the channel estimator 18, and output a replica signal (namely, a replica of the received signal), which includes a delayed wave and involves a time spread.

With a reference to be the square of the difference between a sample of the received signal output from the sampler 13 and a received signal replica obtained by summation of outputs from the signal phase rotators 22, 32 in the adder 16, the maximum likelihood sequence estimator 20 selects the symbol sequence candidate of the signal SIG1 and signal SIG2, whose received signal replica is the closest to the actually received signal, as the decision symbol sequences, and outputs the decision result.

According to the present embodiment, since the frequency difference is adjusted by using the frequency offsets calculated by the frequency offset detector 61, it is possible to adaptively obtain the most suitable rotational frequency. In addition, it is possible to estimate the frequency difference independently even when the center frequency is unknown. As a result, it is not necessary to manage information for identifying the center frequencies, and thus information management in the reception device can be simplified.

In addition, in the above configuration, the rotational frequency controller 15 may output a control signal to the signal phase rotators 22 and 32 to change the signal rotational frequency, and the frequency difference detector 51 may search for a rotational frequency that minimizes the frequency offsets calculated by the frequency offset detector 61, so as to detect the frequency difference between the center frequency of the received signals and the detection reference frequency.

This procedure is explained below.

Figure 7:
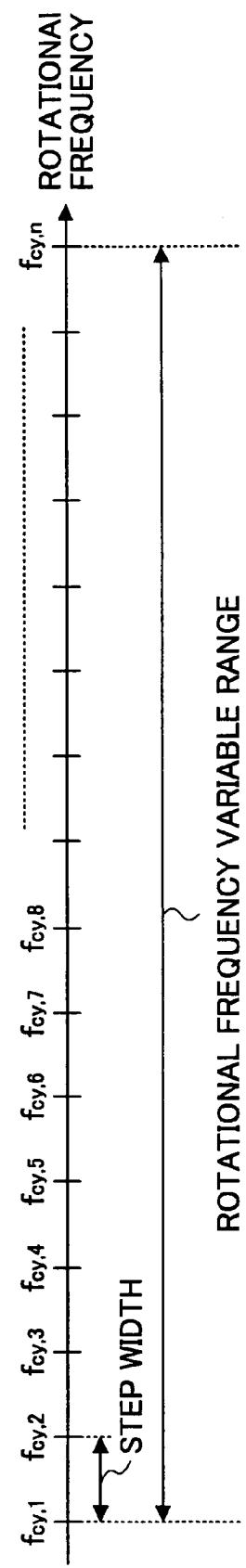
FIG. 7 is a diagram for explaining the rotational frequency in the fourth embodiment.

FIG. 7 is a diagram for explaining the rotational frequency.

As shown in FIG. 7, the variable range of the rotational frequency is divided into equal segments with a certain step width, and these segments are respectively labeled by frequencies $f_{cy,1}$, $f_{cy,2}$, ..., $f_{cy,n}$.

Figure 8:
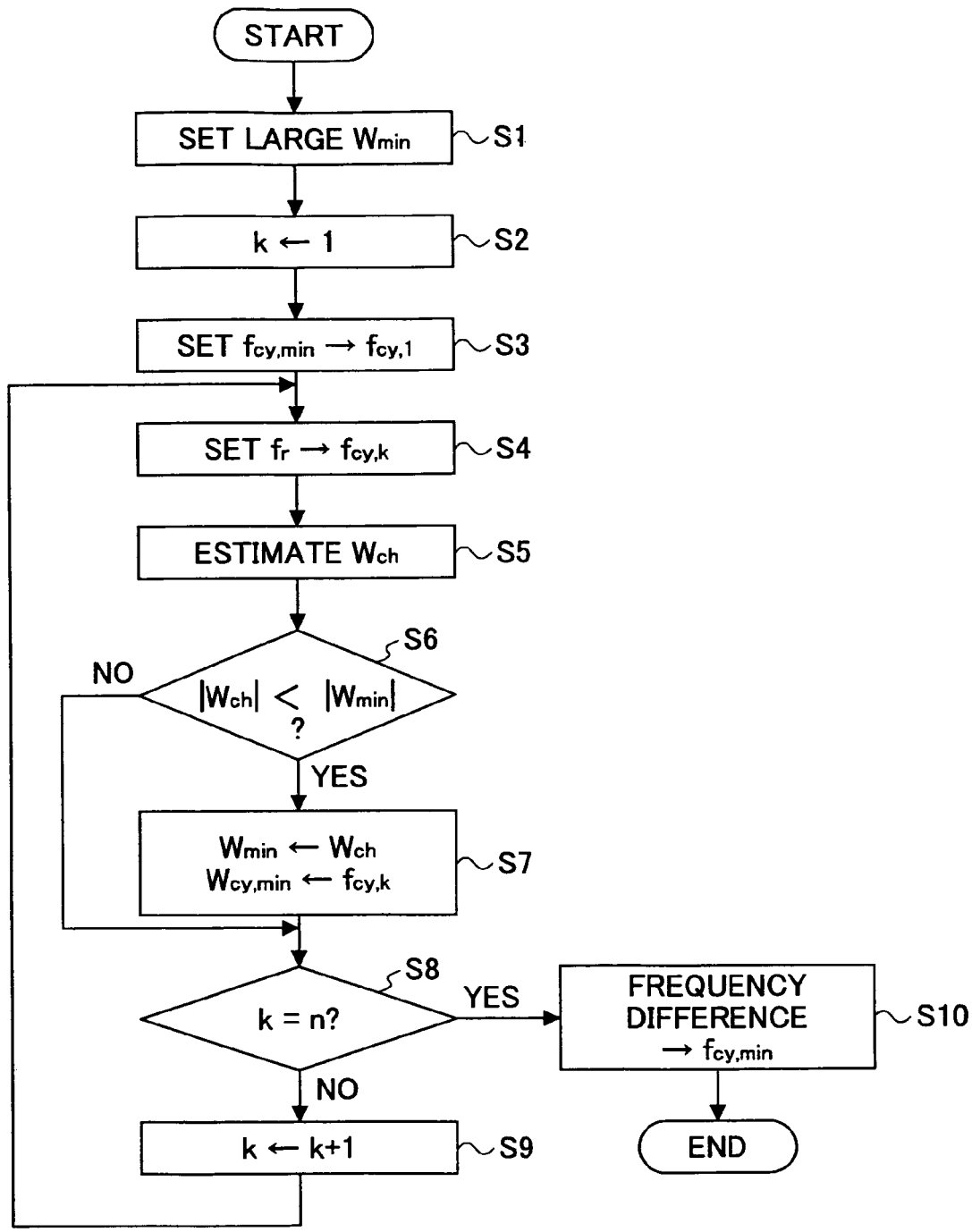
FIG. 8 is a flowchart showing a procedure for detecting the frequency difference in the fourth embodiment.

FIG. 8 is a flowchart showing a procedure of detecting the frequency difference in the present embodiment.

As shown in FIG. 8, in step S1, as an initial value, the minimum frequency offset $W_{min}$ is set to be sufficiently large.

In step S2, an index k is set to be 1.

In step S3, the rotational frequency resulting in the minimum frequency offset is set to be $f_{cy,1}$, as an initial value.

In step S4, the signal rotational frequency (denoted as $f_r$ in FIG. 8) in the signal phase rotators 22 and 32 is set to be $f_{cy,k}$.

In step S5, the frequency offset, $W_{ch}$, is estimated when using the above rotational frequency, $f_{cy,k}$.

In step S6, the absolute value of the frequency offset $W_{ch}$ estimated in step S5 is compared to the absolute value of the minimum frequency offset $W_{min}$.

If the absolute value of the estimated frequency offset $W_{ch}$ is less than the absolute value of the minimum frequency offset $W_{min}$, then, in step S7, the minimum frequency offset $W_{min}$ is replaced by the estimated frequency offset $W_{ch}$, and the signal rotational frequency resulting in the minimum frequency offset is also replaced by $f_{cy,k}$.

If the absolute value of the estimated frequency offset $W_{ch}$ is greater than or equal to the absolute value of the minimum frequency offset $W_{min}$, or after step 7, in step S8, it is determined whether the index k reaches n.

If k is less than n, in step S9, k is incremented by 1, and then operations from step S4 are repeated.

If k is equal to n, in step S10, the detected frequency difference is set to be $f_{cy,min}$, and the routine is finished.

According to the present embodiment, the frequency difference detector 51 makes comparison as described above for all labeled rotational frequencies $f_{cy,1}$, $f_{cy,2}$, ..., $f_{cy,n}$, as shown in FIG. 7, and it is possible to obtain the rotational frequency resulting in a minimum frequency offset in the rotational frequency variable range, that is, to obtain the frequency difference between the center frequencies of the signals in the received signal and the detection reference frequency in the rotational frequency variable range with a simple configuration.

Fifth Embodiment

Figure 9:
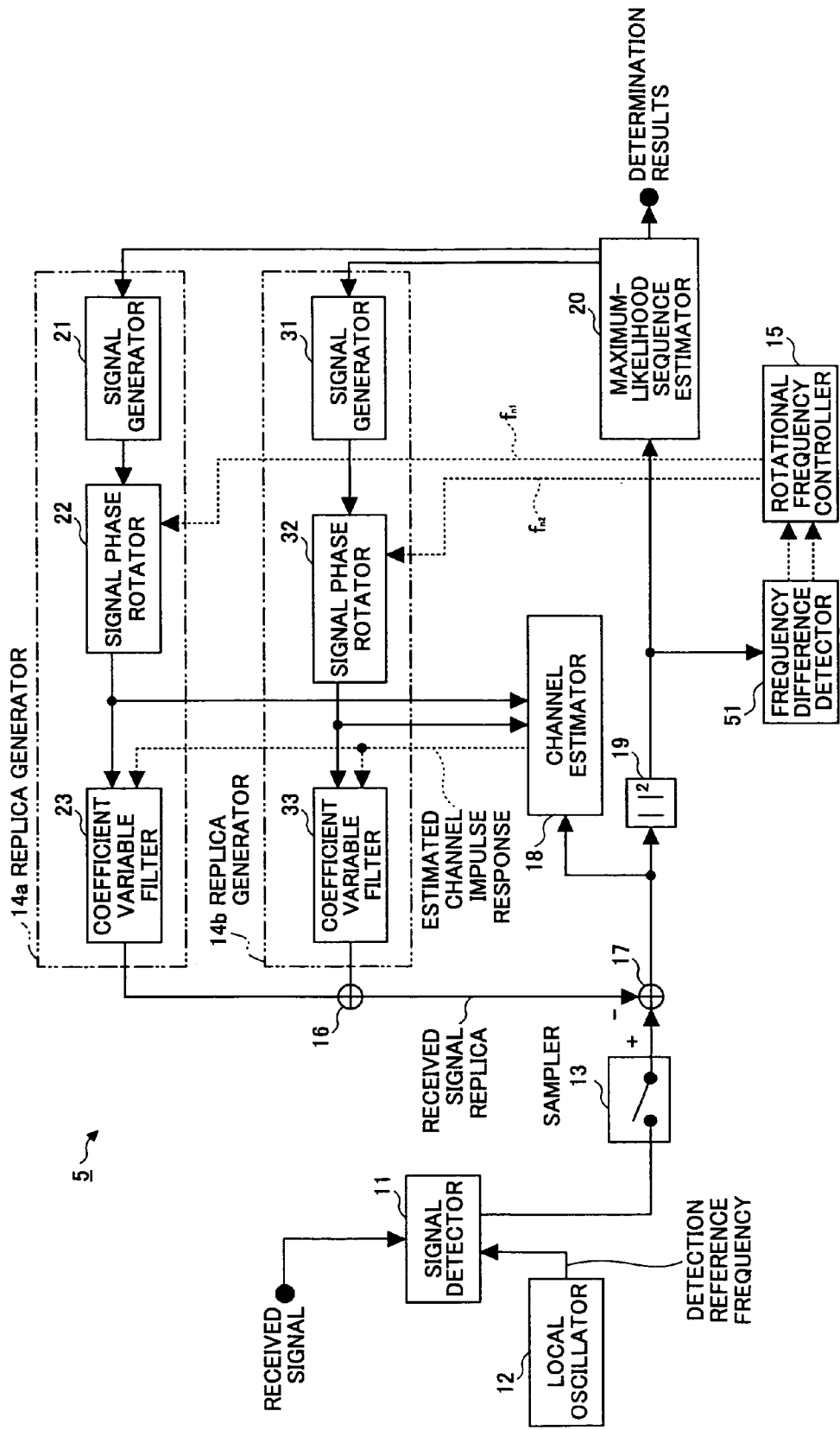
FIG. 9 is a block diagram showing a configuration of a signal reception device 5 according to a fifth embodiment of the present invention.

FIG. 9 is a block diagram showing a configuration of a signal reception device 5 according to a fifth embodiment of the present invention.

The signal reception device 5 of the present embodiment is basically the same as the signal reception device 4 in FIG. 5, except that a frequency offset detector is not included in the signal reception device 5.

In the present embodiment, the same reference numbers are assigned to the same elements as those illustrated in FIG. 1, and overlapping descriptions are omitted.

As illustrated in FIG. 9, the signal detector 11 in the signal reception device 1 receives a signal from a number of transmission devices, and the received signal includes plural signal components (here, the signal SIG1 and the signal SIG2) having different center frequencies.

The local oscillator 12 generates a reference signal having a detection reference frequency and inputs this reference signal into the signal detector 11.

The received signal detected by the signal detector 11 is input to the subtraction section 17 through the sampler 13. The subtraction section 17 subtracts a replica of the received signal from samples output by the sampler 13, and outputs the result as an error signal to the channel estimator 18 and the squaring section 19.

The channel estimator 18 successively estimates channels by using the phase-rotated signal candidates from the signal phase rotators 22, 32, and the difference between the received signal replica and the sample of the received signal, and outputs the estimated channel impulse responses to the coefficient variable filters 23, 33.

The signal generator 21 and the signal generator 31 modulate the symbol sequence candidates, and output the modulated symbol sequence candidates to the signal phase rotators 22 and 32 as signal candidates in the signal space.

The signal phase rotators 22 and 32 rotate phases of the signal candidates according to a control signal output from the rotational frequency controller 15, which is related to a rotational frequency.

The phase-rotated signal candidates generated by the signal phase rotators 22, 32 are input to the coefficient variable filters 23, 33, and the channel estimator 18.

The coefficient variable filters 23, 33 set filter coefficients according to estimated channel impulse responses obtained by the channel estimator 18, and output a replica signal (namely, a replica of the received signal), which includes a delayed wave and involves a time spread.

The squaring section 19 calculates the square of the difference between the replica of the received signal and the sample of the received signal, and outputs the result to the maximum likelihood sequence estimator 20 and the frequency difference detector 51. When the signals are complex, the squaring section 19 further multiplies the complex conjugation.

With a reference to be the square of the difference between a sample of the received signal output from the sampler 13 and a received signal replica obtained by summation of outputs from the signal phase rotators 22, 32 in the adder 16, the maximum likelihood sequence estimator 20 selects the symbol sequence candidate of the signal SIG1 and signal SIG2, whose received signal replica is the closest to the actually received signal, as the decision symbol sequences, and outputs the decision result.

The rotational frequency controller 15 outputs a control signal to change the signal rotational frequency of the signal phase rotators 22 and 32. The frequency difference detector 51 searches for a rotational frequency that minimizes a mean square error, which is output by the squaring section 19. Thereby, the frequency difference detector 51 detects the frequency difference between the frequencies of the signals in the received signal and the detection reference frequency.

Specifically, as shown in FIG. 7, the variable range of the rotational frequency is divided into equal segments with a certain step width, and these segments are respectively labeled by frequencies $f_{cy,1}, f_{cy,2}, \ldots, f_{cy,n}$.

Figure 10:
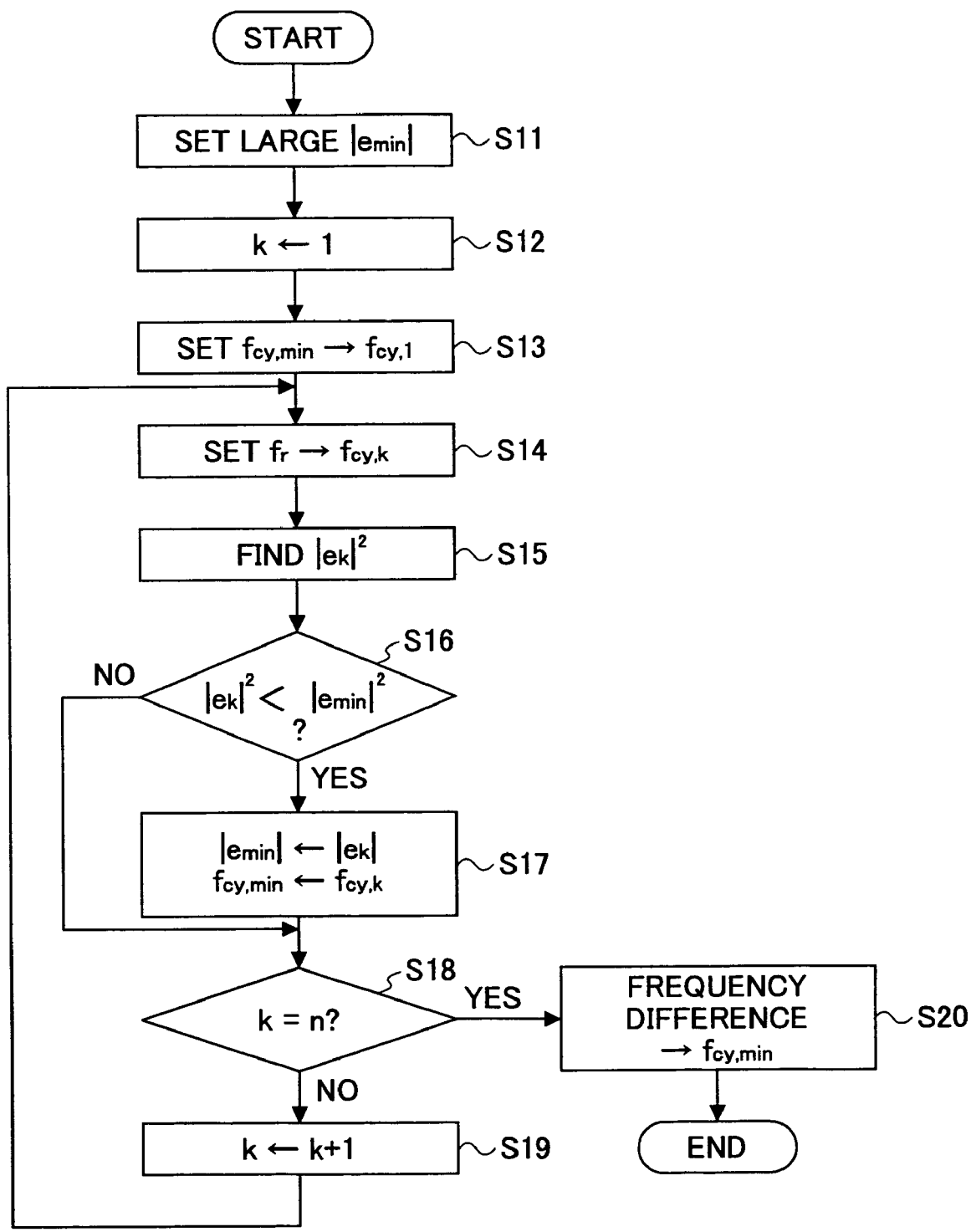
FIG. 10 is a flowchart showing a procedure for detecting the frequency difference between the frequency of the received signals and the detection reference frequency in the fifth embodiment.

FIG. 10 is a flowchart showing a procedure of detecting the frequency difference between the frequencies of the signals in the received signal and the detection reference frequency in the present embodiment.

As shown in FIG. 10, in step S11, an initial value of the minimum mean square error $|e_{min}|$ is set to be sufficiently large.

In step S12, an index k is set to be 1.

In step S13, the rotational frequency resulting in the minimum mean square error is set to be $f_{cy,1}$, as an initial value.

In step S14, the signal rotational frequency (denoted as $f_r$ in FIG. 10) in the signal phase rotators 22 and 32 is set to be $f_{cy,k}$.

In step S15, the mean square error $|e_k|^2$ is calculated when using the above rotational frequency.

In step S16, the mean square error $|e_k|^2$ calculated in step S15 is compared to $|e_{min}|^2$, the minimum mean square error.

If the mean square error $|e_k|^2$ calculated in step S15 is less than the minimum mean square error $|e_{min}|^2$, then, in step S17, the minimum mean square error $|e_{min}|^2$ is replaced by the mean square error $|e_k|$, and the signal rotational frequency resulting in the minimum mean square error is also replaced by $f_{cy,k}$.

If the mean square error $|e_k|^2$ calculated in step S15 is greater than or equal to the minimum mean square error $|e_{min}|^2$, then, in step S18, it is determined whether the index k reaches n.

If k is less than n, in step S19, k is incremented by 1, and then operations from step S14 are repeated.

If k is equal to n, in step S20, the detected frequency difference is set to be $f_{cy,min}$, and the routine is finished.

According to the present embodiment, the frequency difference detector 51 makes comparison as described above for all labeled rotational frequencies $f_{cy,1}, f_{cy,2}, \ldots, f_{cy,n}$ as shown in FIG. 7, and it is possible to obtain the rotational frequency resulting in a minimum mean square error in the rotational frequency variable range, that is, to obtain the frequency difference between the center frequencies of the signals in the received signal and the detection reference frequency in the rotational frequency variable range.

Sixth Embodiment

Figure 11:
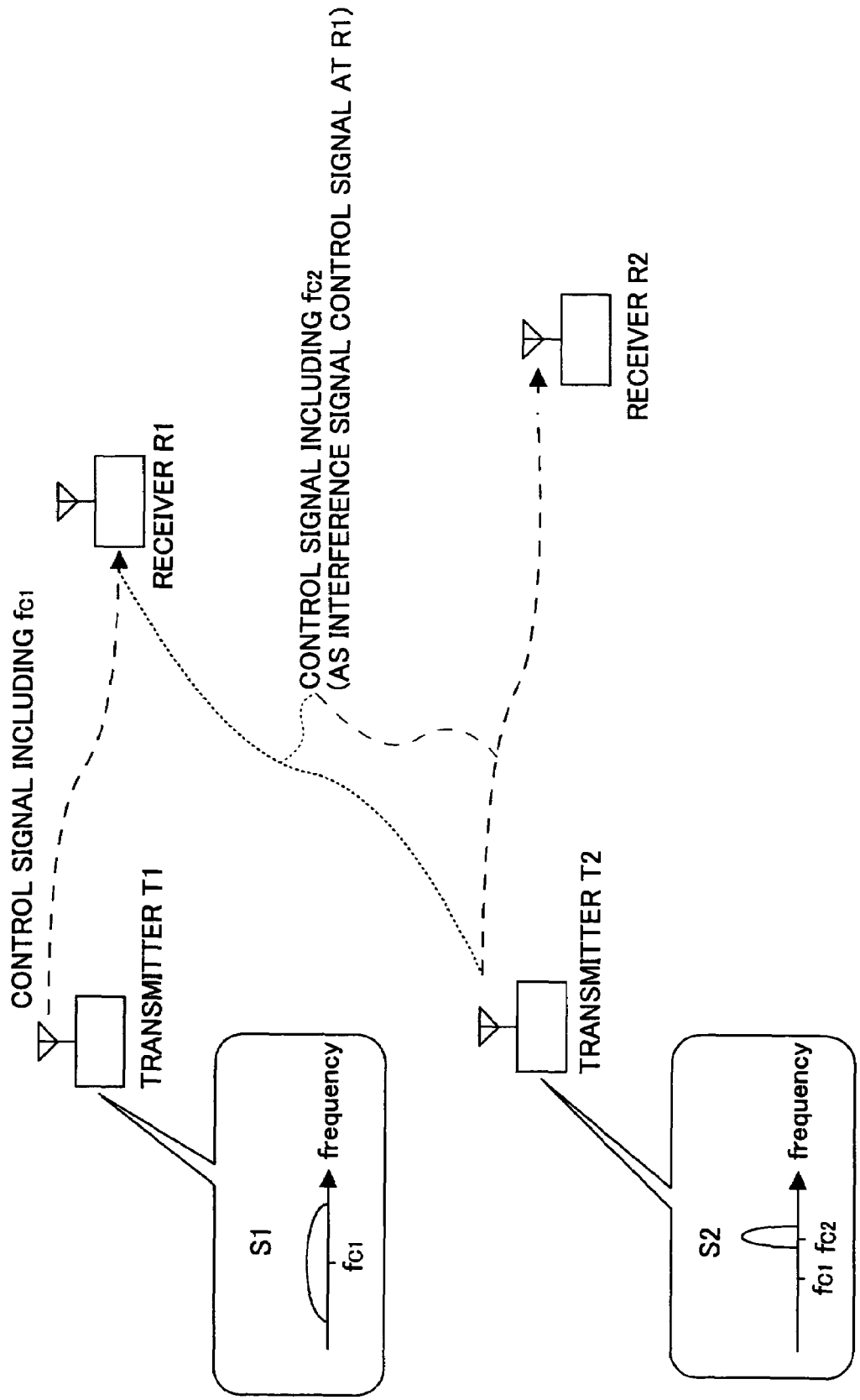
FIG. 11 is a diagram illustrating transmission and reception of control signals in a wireless communication system according to a sixth embodiment of the present invention.

FIG. 11 is a diagram illustrating transmission and reception of control signals in a wireless communication system according to a sixth embodiment of the present invention.

Figure 26:
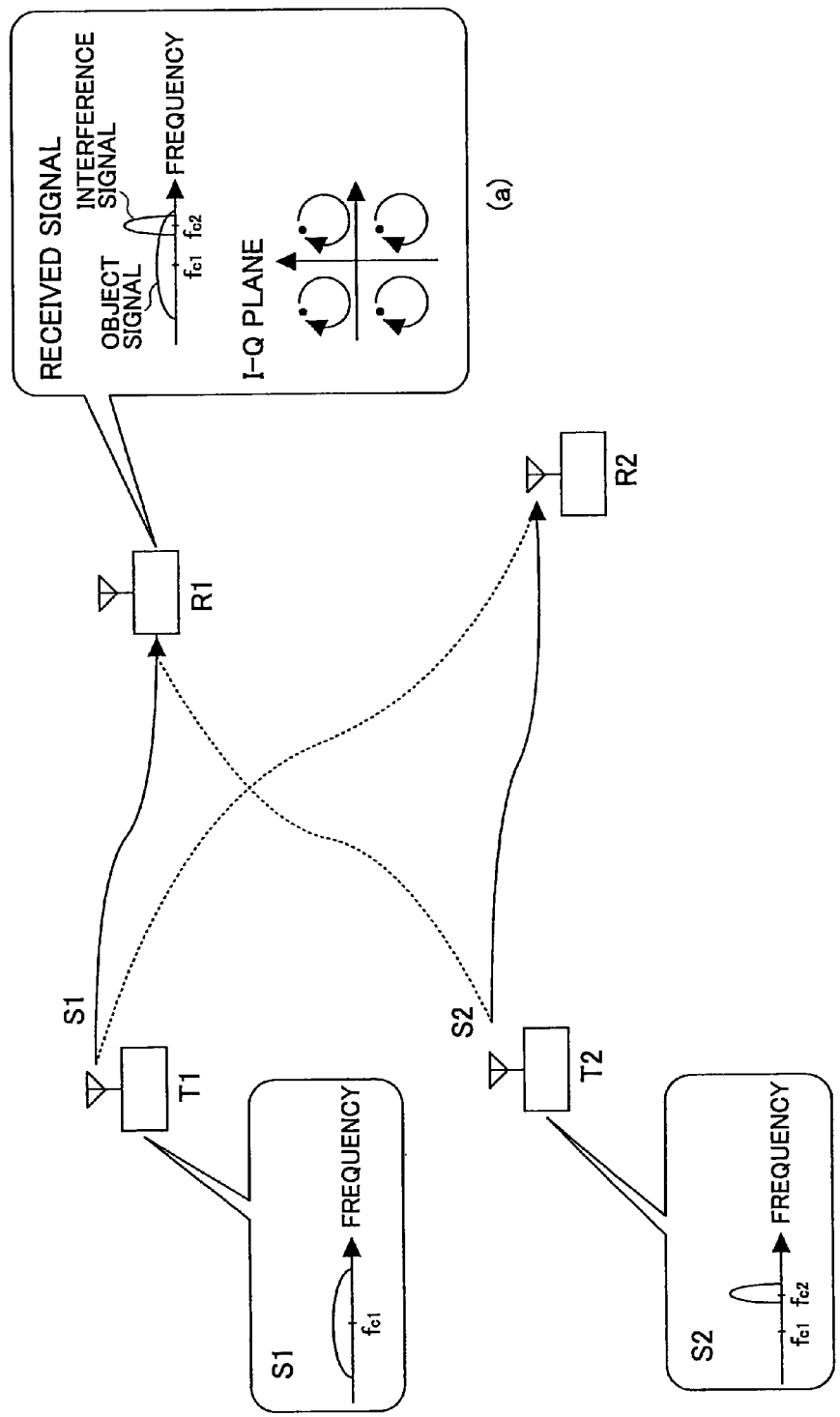
FIG. 26 is a diagram illustrating a problem of the related art when signals having different center frequencies are superposed on the same frequency for transmission.

The wireless communication system of the present embodiment has the same configuration as the related art as shown in FIG. 26, that is, it includes a number of transmission devices T1, T2 and reception devices R1, R2, which communicate with each other.

As shown in FIG. 11, the transmission devices T1, T2 transmit control signals including information of the center frequencies of each signal to be transmitted. The reception devices R1, R2 receive not only the control signals of the desired signal, but also those of the interference signals. For example, the reception device R1 receives the control signal including information of the center frequency fc1 of the signal SIG1 from the transmission device T1, and also the control signal including information of the center frequency fc2 of the signal SIG2 from the transmission device T2.

Figure 12:
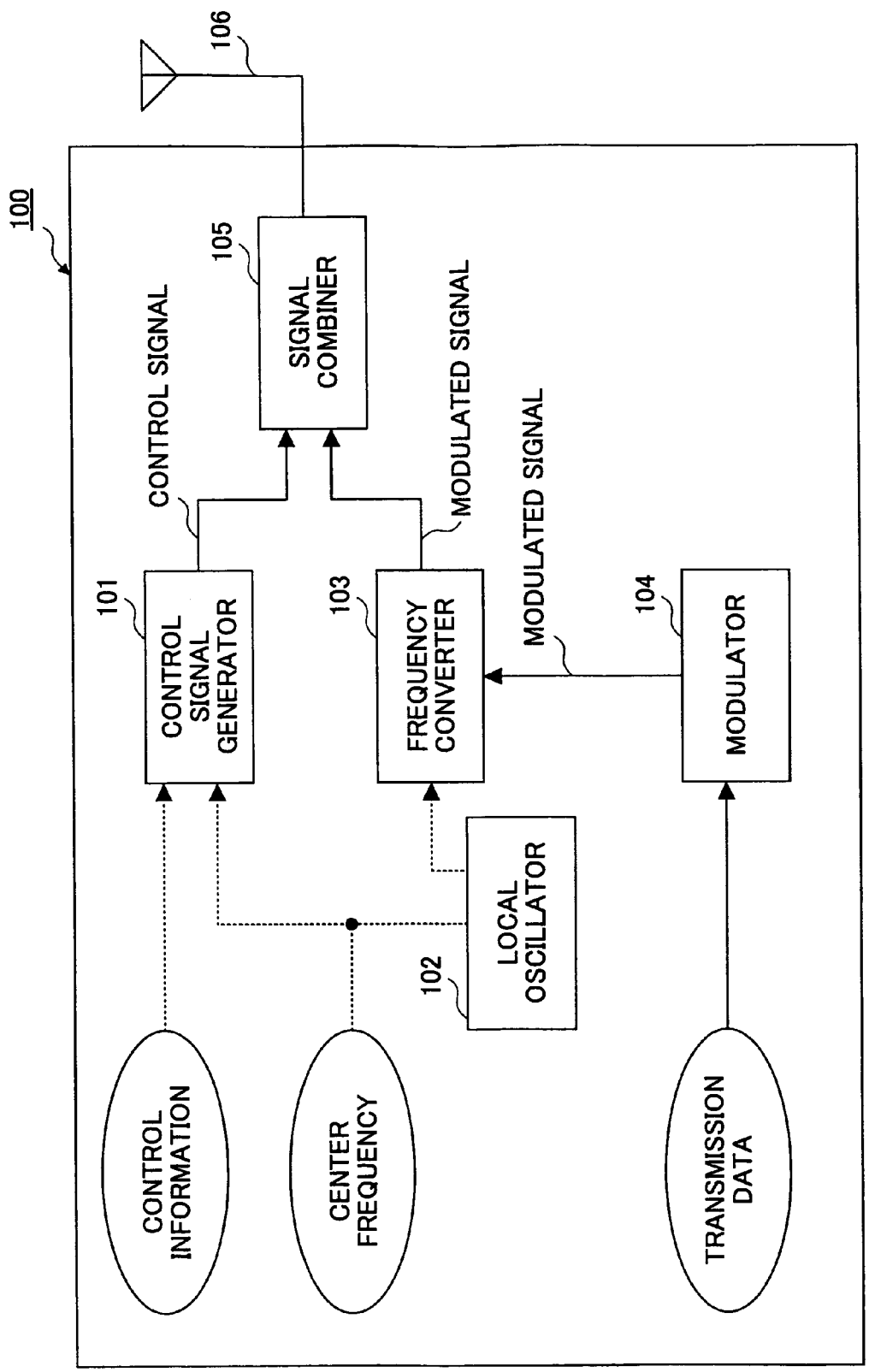
FIG. 12 is a block diagram illustrating a transmission device 100 for transmitting the above control signals according to the sixth embodiment.

FIG. 12 is a block diagram illustrating a transmission device 100 for transmitting the above control signals according to the present embodiment.

As illustrated in FIG. 12, the transmission device 100 includes a control signal generator 101, a local oscillator 102, a frequency converter 103, a modulator 104, a signal combiner 105, and an antenna 106.

The control signal generator 101 generates a control signal including information of the center frequency to be used and other control information, and sends the control signal to the signal combiner 105. The information of the center frequency is also input to the local oscillator 102, and the local oscillator 102 inputs a reference signal, which has a detection reference frequency corresponding to the center frequency, into the frequency converter 103. The frequency converter 103 controls the center frequency of the modulated data signal output from the modulator 104. The modulated data signal, whose center frequency is processed by the frequency converter 103, is output to the signal combiner 105. The signal combiner 105 combines the modulated data signal and the control signal. The combined signal is transmitted through the antenna 106 to the reception devices.

Figure 13:
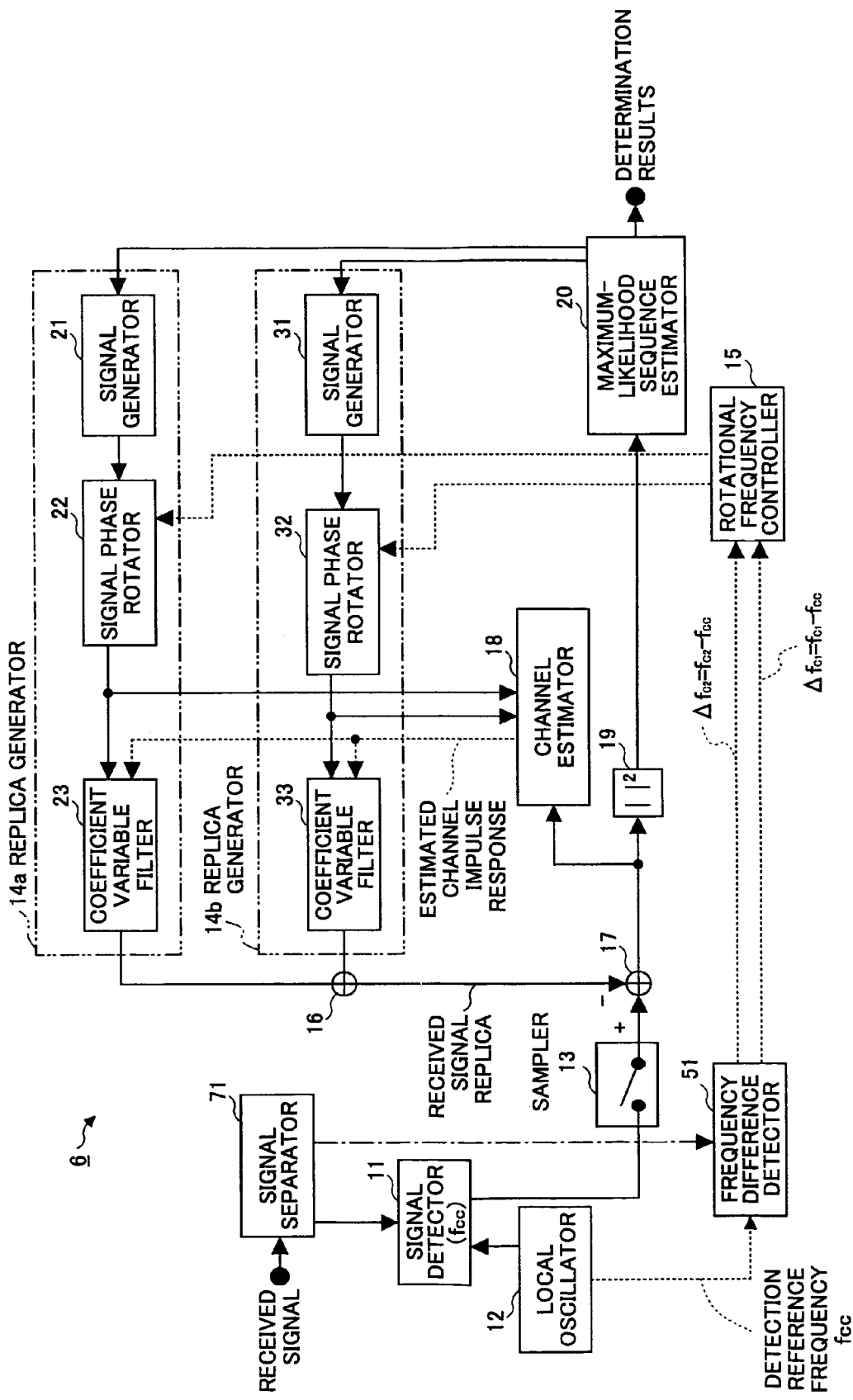
FIG. 13 is a block diagram showing a configuration of a signal reception device 6 according to the sixth embodiment of the present invention.

FIG. 13 is a block diagram showing a configuration of a signal reception device 6 according to the present embodiment of the present invention.

Compared to the signal reception device 2 in FIG. 3, the signal reception device 6 of the present embodiment includes a signal separator 71 in addition to the configuration of the signal reception device 2 in FIG. 3, and except for the signal separator 71, the operations of the signal reception device 6 of the present embodiment are the same as the signal reception device 2 in FIG. 3.

Below, the same reference numbers are assigned to the same elements as those illustrated in FIG. 3, and overlapping descriptions are omitted.

As illustrated in FIG. 13, a combined signal of the modulated data signal and the control signal is input to the signal separator 71. The control signal includes information of the center frequencies of plural signals having different center frequencies. The modulated data signal corresponds to each of the plural signals.

The signal separator 71 separates the modulated data signal and the control signal, extracts information of the center frequencies from the control signal, and inputs the information to the frequency difference detector 51 and the signal detector 11.

Figure 14:
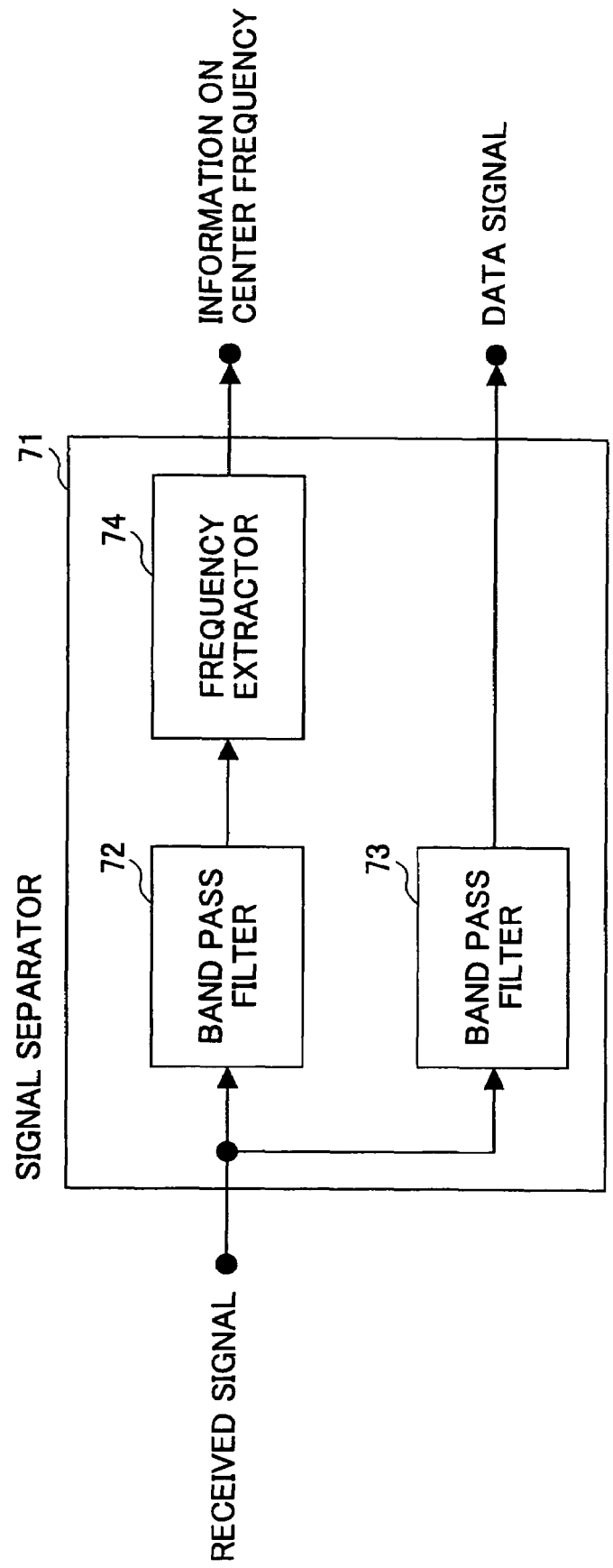
FIG. 14 is a block diagram showing an example of a configuration of the signal separator 71 according to the sixth embodiment of the present invention.

FIG. 14 is a block diagram showing an example of a configuration of the signal separator 71 according to the present embodiment of the present invention.

When the control signals are transmitted through control frequency bands common to transmission devices, which share a part of or the whole frequency band, as illustrated in FIG. 14, the signal separator 71 uses a band pass filter 72 for passing the control signals and a band pass filter 73 for passing the data signals to separate the modulated data signal and the control signal.

A frequency data extractor 74 extracts information of the center frequencies from the control signal, and separates the modulated data signal and information of the center frequencies.

In addition, when the frequency information signal and the data signal are transmitted by using the same frequency band, the transmission device may use known and intrinsic symbol sequences for the center frequencies as the frequency information. In doing so, the signal separator 71 can obtain the frequency information by calculating correlation of the known symbol sequences, and the information of the center frequencies can be obtained.

In this case, the frequency difference detector 51 in the reception device 6 calculates frequency differences between the center frequencies of the input plural signals and the detection reference frequency from the center frequency information, and outputs information of the frequency differences to the signal phase rotators 22 and 32.

In this way, the reception device 6 can easily detect the center frequencies of the received signals at high speeds, and generate received signal replicas at high precision.

Seventh Embodiment

Figure 15:
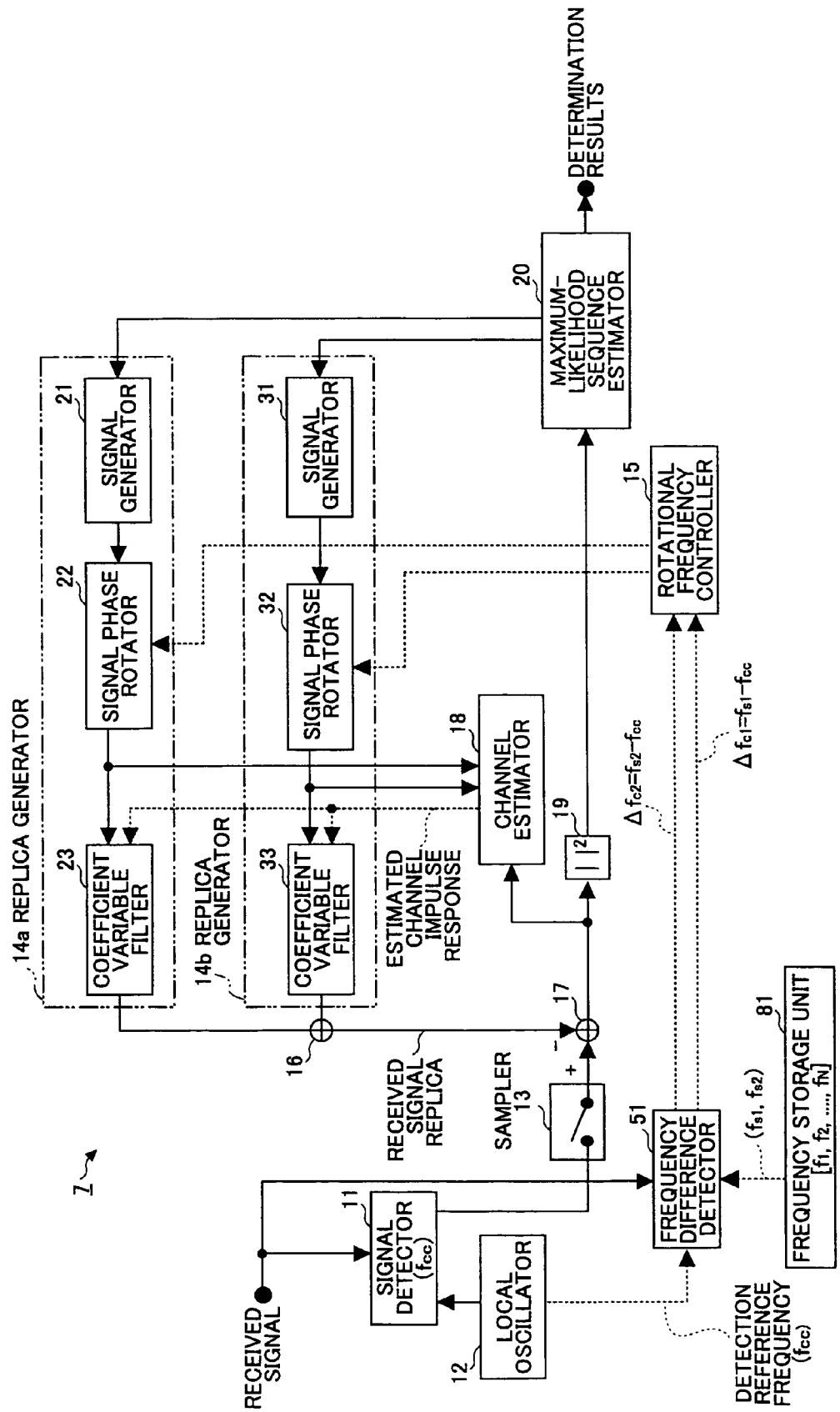
FIG. 15 is a block diagram showing a configuration of a signal reception device 7 according to a seventh embodiment of the present invention.

FIG. 15 is a block diagram showing a configuration of a signal reception device 7 according to a seventh embodiment of the present invention.

Compared to the signal reception device 2 in FIG. 3, the signal reception device 7 of the present embodiment includes a frequency storage unit 81 in addition to the configuration of the signal reception device 2 in FIG. 3, and except for the frequency storage unit 81, the operations of the signal reception device 7 are the same as the signal reception device 2 in FIG. 3.

Below, the same reference numbers are assigned to the same elements as those illustrated in FIG. 3, and overlapping descriptions are omitted.

As illustrated in FIG. 15, the frequency storage unit 81 holds a list of the center frequencies with some probability of being used by a signal transmission device. From this list, frequencies which may probably used for a number of input signals are selected, and are input to the frequency difference detector 51. Below, a selected frequency is referred to as "selected frequency ($f_{sel}$)".

As for methods of selecting frequencies, for example, frequency information can be used, or the center frequencies are estimated by using the estimated frequency differences, which is obtained by observing the phase rotation of the estimated channel impulse responses, and then frequencies closet to the estimated frequency differences may be selected from the list.

The frequency difference detector 51 calculates frequency differences ($\Delta f_{c1}$, $\Delta f_{c2}$) between the selected frequencies ($f_{s1}$, $f_{s2}$) from the frequency storage unit 81 and detection reference frequency ($f_{cc}$) by using the following equations (4a) and (4b), and outputs the frequency differences ($\Delta f_{c1}$, $\Delta f_{c2}$) to the signal phase rotators 22 and 32.

$$\Delta f_{c1} = f_{s1} - f_{cc} \tag{4a}$$

$$\Delta f_{c2} = f_{s2} - f_{cc} \tag{4b}$$

With the above configuration, the signal reception device 7 can accurately set the rotational frequencies in the signal phase rotators 22 and 32 even without control signals. As a result, it is possible to avoid degradation of estimation accuracy of the estimated channel impulse responses caused by the estimation accuracy degradation of frequency difference.

Eighth Embodiment

Figure 16:
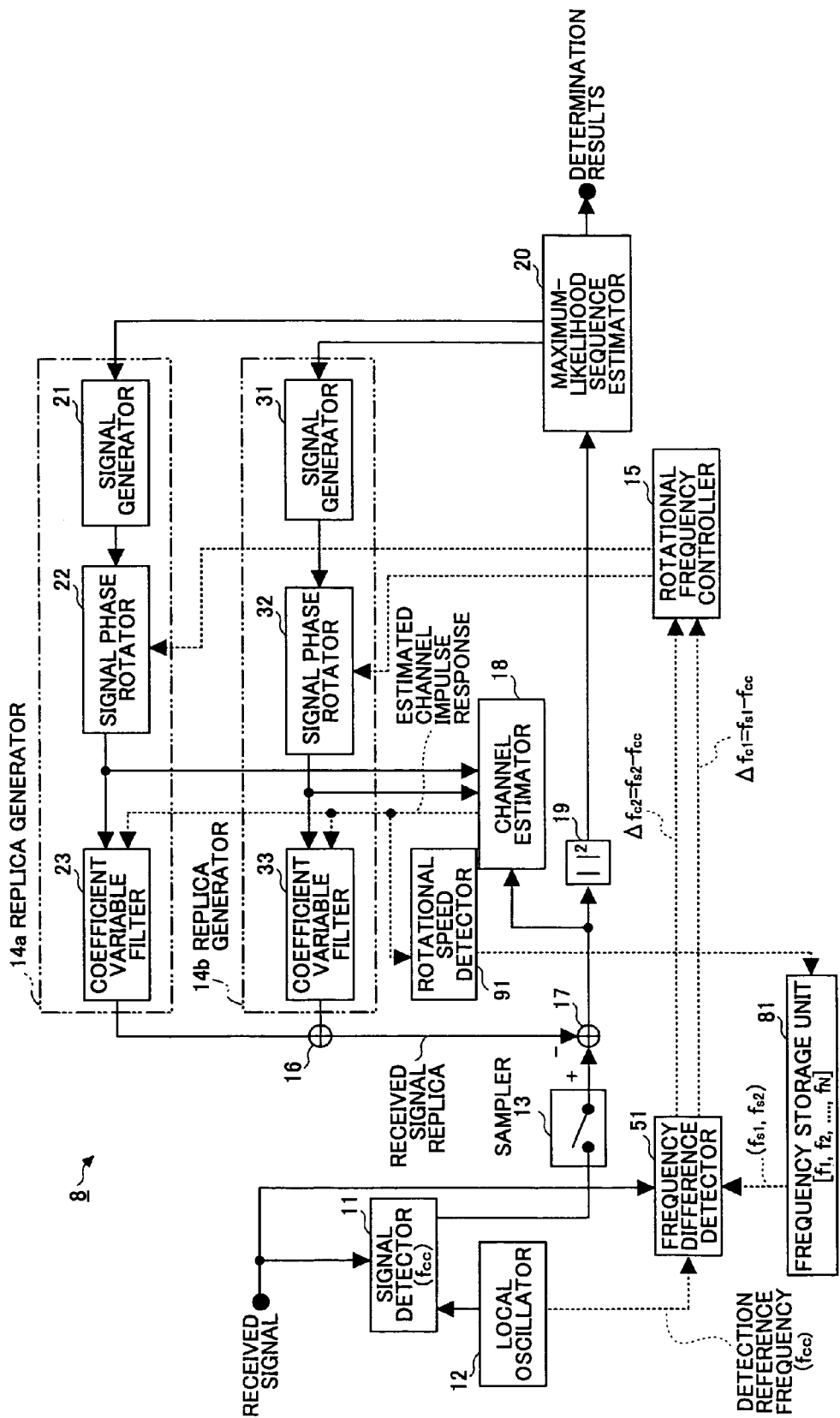
FIG. 16 is a block diagram showing a configuration of a signal reception device 8 according to an eighth embodiment of the present invention.

FIG. 16 is a block diagram showing a configuration of a signal reception device 8 according to an eighth embodiment of the present invention.

Compared to the signal reception device 7 in FIG. 15, the signal reception device 7 of the present embodiment includes a rotation speed detector 91 in addition to the configuration of the signal reception device 7 in FIG. 15, and except for the rotation speed detector 91, the operations of the signal reception device 8 are the same as the signal reception device 7 in FIG. 15.

Below, the same reference numbers are assigned to the same elements as those illustrated in FIG. 15, and overlapping descriptions are omitted.

Figure 17:
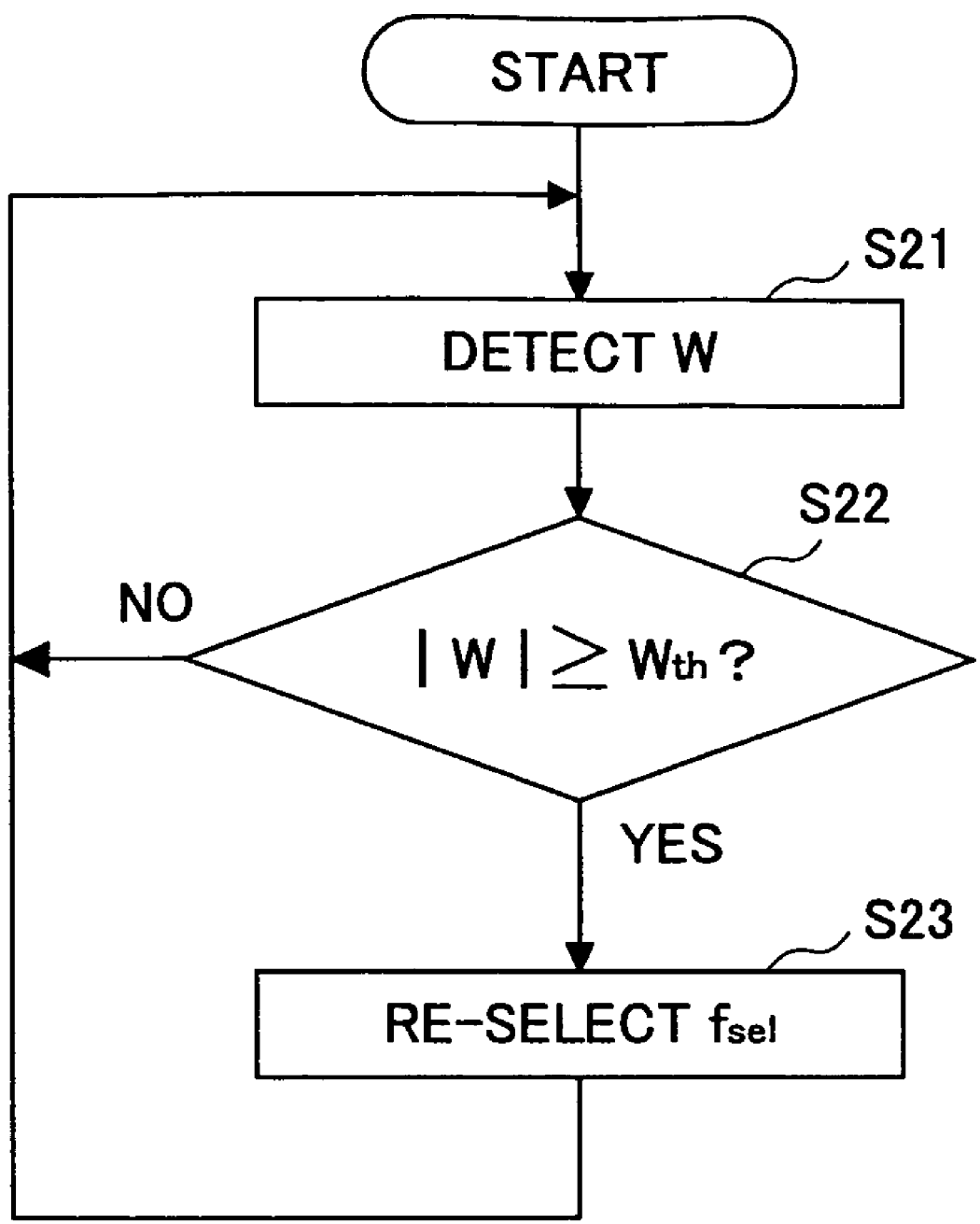
FIG. 17 is a flowchart showing an operation of the frequency storage unit 81 in the eighth embodiment.

FIG. 17 is a flowchart showing an operation of the frequency storage unit 81 in the present embodiment.

As illustrated in FIG. 17, in step S21, in the frequency storage unit 81, a rotation speed (w) of an estimated channel impulse response, which is measured by the rotation speed detector 91, is detected.

In step S22, the absolute value of the detected rotation speed (|w|) is compared to a threshold value ($w_{th}$) of the rotation speed.

If the absolute value of the detected rotation speed (|w|) is less than the rotation speed threshold value ($w_{th}$), then, it is determined that the selected frequency (denoted as $f_{sel}$ in FIG. 17) is appropriate, and the routine returns to step S21.

If the absolute value of the detected rotation speed (|w|) is greater than or equal to the rotation speed threshold value ($w_{th}$), then, it is determined that the selected frequency is different from the center frequency actually being used, so the selected frequencies should be selected again. Specifically, if the rotation speed is positive (the rotation direction is counter clockwise), it is determined that the selected frequency is lower than the actually used center frequency, and a higher frequency should be selected. This can be done by following the procedure shown in FIG. 18.

Figure 18:
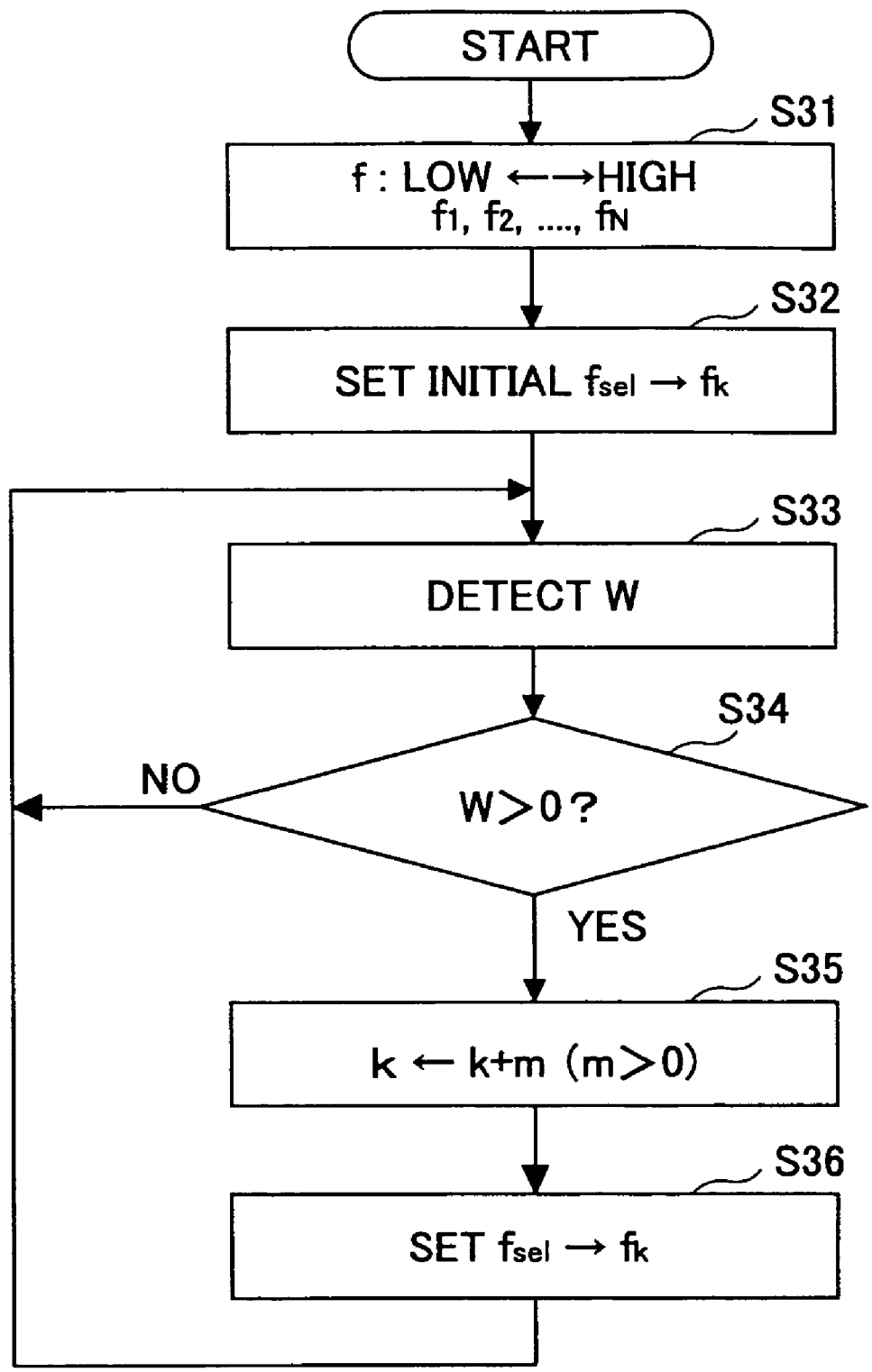
FIG. 18 is a flowchart showing another operation of the frequency storage unit 81 in the eighth embodiment.

FIG. 18 is a flowchart showing another operation of the frequency storage unit 81 in the present embodiment.

As illustrated in FIG. 18, in step S31, in the frequency storage unit 81, the center frequencies stored in the list are arranged in order from low to high. These center frequencies are denoted by symbols ($f_1, f_2, \ldots, f_N$) having subscripts arranged in the same order. That is, a small subscript corresponds to a low frequency, and a large subscript corresponds to a high frequency.

In step S32, an initial value of a selected frequency (denoted as $f_{sel}$ in FIG. 18) is set to be $f_k$.

In step S33, the rotation speed (w) of the estimated channel impulse response measured by the rotation speed detector 91 is detected.

In step S34, it is determined that whether the detected rotation speed (w) is positive or negative.

If it is determined that the detected rotation speed (w) is not positive, steps S33 and S34 are repeated.

If it is determined that the detected rotation speed (w) is positive, then in step S35, a frequency having a subscript (k+m) larger than the subscript (k) of the frequency being presently used is specified.

In step S36, the specified frequency is set to be the selected frequency.

The procedure illustrated in FIG. 18 is associated with frequency selection when the detected rotation speed (w) is positive. When the rotation speed is negative (that is, the rotation direction is clockwise), instead of step S35 in the flowchart in FIG. 18, it is determined that the selected frequency is higher than the actually used center frequency, and lower frequency should be selected. This can be done following the procedure shown in FIG. 19.

Figure 19:
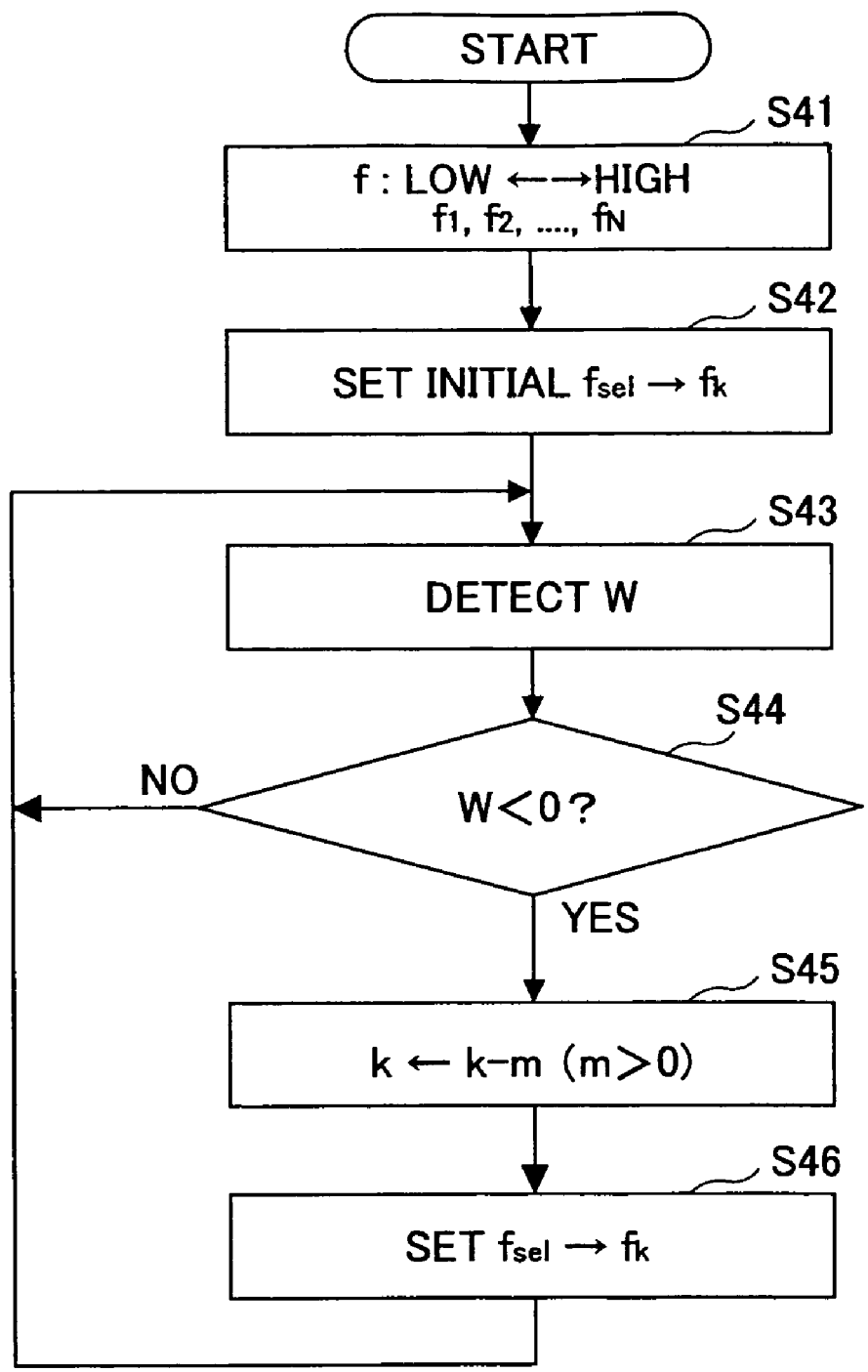
FIG. 19 is a flowchart showing another operation of the frequency storage unit 81 in the eighth embodiment.

FIG. 19 is a flowchart showing another operation of the frequency storage unit 81 in the present embodiment.

As illustrated in FIG. 19, in step S41, in the frequency storage unit 81, the center frequencies stored in the list are arranged in order from low to high. These center frequencies are denoted by symbols ($f_1, f_2, \ldots, f_N$) having subscripts arranged in the same order. That is, a small subscript corresponds to a low frequency, a large subscript corresponds to a high frequency.

In step S42, an initial value of a selected frequency (denoted as $f_{sel}$ in FIG. 19) is set to be $f_k$.

In step S43, the rotation speed (w) of the estimated channel impulse response measured by the rotation speed detector 91 is detected.

In step S44, it is determined that whether the detected rotation speed (w) is positive or negative.

If it is determined that the detected rotation speed (w) is not negative, steps S43 and S44 are repeated.

If it is determined that the detected rotation speed (w) is negative, then in step S45, a frequency having a subscript (k-m) smaller than the subscript (k) of the frequency being presently used is specified.

In step S46, the specified frequency is set to be the selected frequency.

In the above, it is described that frequency selection is performed separately from different procedures when the detected rotation speed (w) is positive and when the rotation speed is negative. Of course, frequency selection can be performed in the same procedure when the detected rotation speed (w) is positive and when the rotation speed is negative. This can be done following the procedure shown in FIG. 20.

Figure 20:
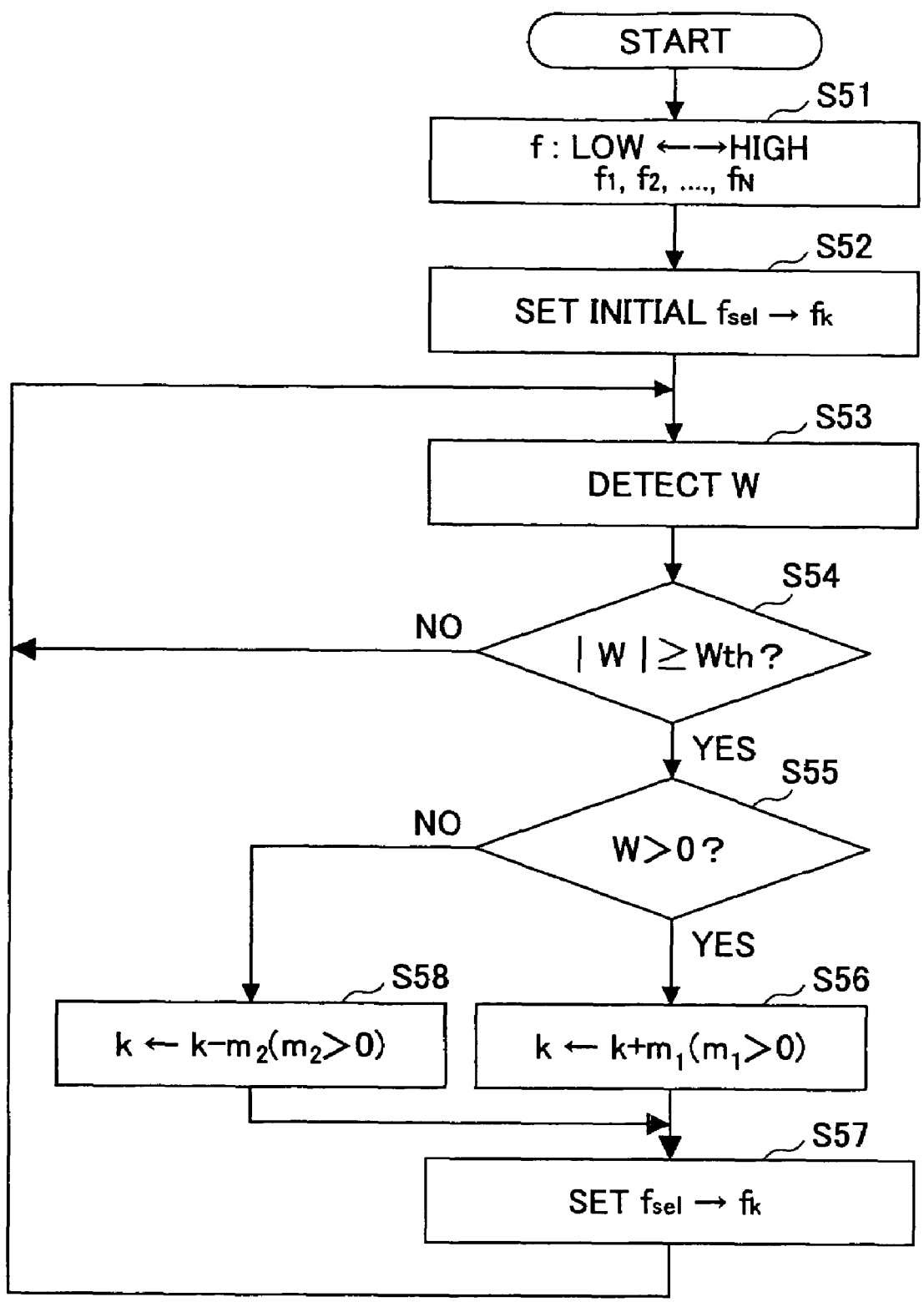
FIG. 20 is a flowchart showing another operation of the frequency storage unit 81 in the eighth embodiment.

FIG. 20 is a flowchart showing another operation of the frequency storage unit 81 in the present embodiment.

As illustrated in FIG. 20, in step S51, in the frequency storage unit 81, the center frequencies stored in the list are arranged in order from low to high. These center frequencies are denoted by symbols ($f_1, f_2, \ldots, f_N$) having subscripts arranged in the same order. That is, a small subscript corresponds to a low frequency, a large subscript corresponds to a high frequency.

In step S52, an initial value of a selected frequency (denoted as $f_{sel}$ in FIG. 20) is set to be $f_k$.

In step S53, the rotation speed (w) of the estimated channel impulse response measured by the rotation speed detector 91 is detected.

In step S54, the absolute value of the detected rotation speed ($|w|$) is compared to a threshold value ($w_{th}$) of the rotation speed.

If it is determined that the absolute value of the detected rotation speed ($|w|$) is less than the rotation speed threshold value ($w_{th}$), it is determined that the selected frequency is appropriate, and the routine returns to step S53 for rotation speed detection.

If it is determined that the absolute value of the detected rotation speed ($|w|$) is greater than or equal to the rotation speed threshold value ($w_{th}$), then, the routine jumps to step S55 to determine that whether the detected rotation speed (w) is positive or negative.

If it is determined that the detected rotation speed (w) is positive (the rotation direction is counter clockwise), then in step S56, a frequency having a subscript (k+m1) larger than the subscript (k) of the frequency being presently used is specified.

In step S57, the specified frequency is set to be the selected frequency to increase the selected frequency.

On the other hand, in step S55, if it is determined that the detected rotation speed (w) is negative (that is, the rotation direction is clockwise), then in step S58, a frequency having a subscript (k-m2) smaller than the subscript (k) of the frequency being presently used is specified.

In step S57, the specified frequency is set to be the selected frequency to decrease the selected frequency.

According to the present embodiment, even when the initial value of the selected frequency is not appropriate, the selected frequency is corrected to be appropriate within a certain time period. That is, by using methods of the present embodiment, even when information of the center frequencies is not available, the reception device can estimate the frequency difference with high precision, and separate and extract signals having different center frequencies with high precision.

In addition, because the rotation speed used by the signal phase rotator is compared to the phase rotation speed of the signal, and if the difference between the phase rotation speeds is large, the selected frequency is selected again, and it is possible to obtain the selected frequencies close to the difference between the center frequencies of the received signals and the detection reference frequency.

Further, it is possible to adjust the selected frequencies to be approach the difference between the center frequencies of the received signals and the detection reference frequency at a high speed.

Ninth Embodiment

Figure 21:
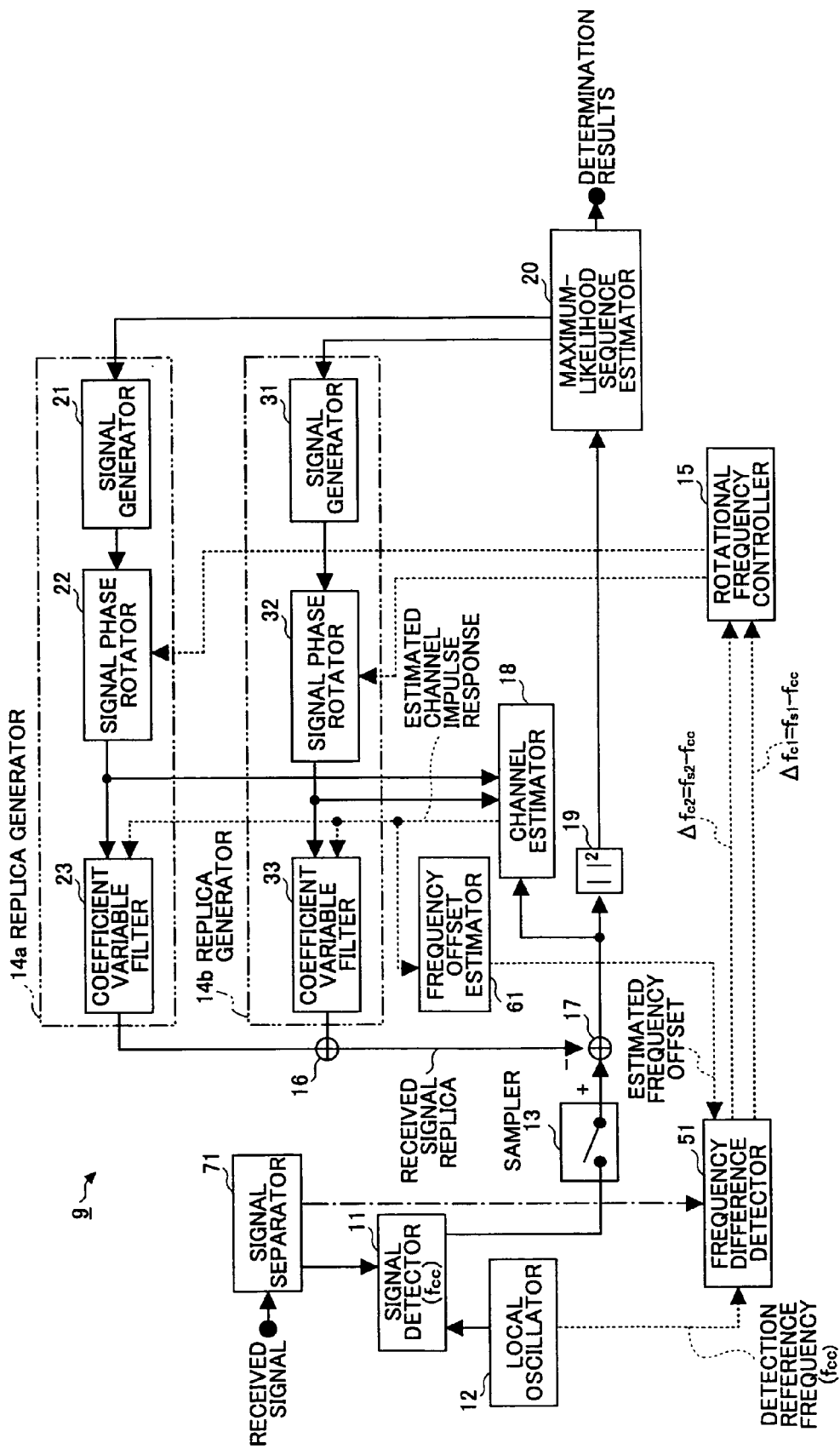
FIG. 21 is a block diagram showing a configuration of a signal reception device 9 according to a ninth embodiment of the present invention.

FIG. 21 is a block diagram showing a configuration of a signal reception device 9 according to a ninth embodiment of the present invention.

Compared to the signal reception device 6 in FIG. 13, the signal reception device 9 of the present embodiment includes the frequency offset detector 61 in addition to the configuration of the signal reception device 9 in FIG. 21, and except for the frequency offset detector 61, the operations of the signal reception device 9 are the same as the signal reception device 6 in FIG. 13.

Below, the same reference numbers are assigned to the same elements as those illustrated in FIG. 15, and overlapping descriptions are omitted.

As illustrated in FIG. 11 and FIG. 12, the transmission devices T1, T2 transmit data signals and control signals including information of the center frequencies of the signals to be transmitted.

As illustrated in FIG. 13, a combined signal of the modulated data signal and the control signal is input to the signal separator 71. The signal separator 71 separates the combined signal into modulated data signal and the control signal, and inputs the control signal to the frequency difference detector 51, and the modulated data signal to the signal detector 11.

The frequency difference detector 51 calculates frequency differences between the center frequencies, which are obtained from the control signal, and the detection reference frequency, and outputs the calculated frequency differences to the rotational frequency controller 15. At this moment, the actual center frequencies of the received signals may deviate from desired center frequencies specified by the control signal due to the inaccuracy of the local oscillator of the transmission device.

Figure 22:
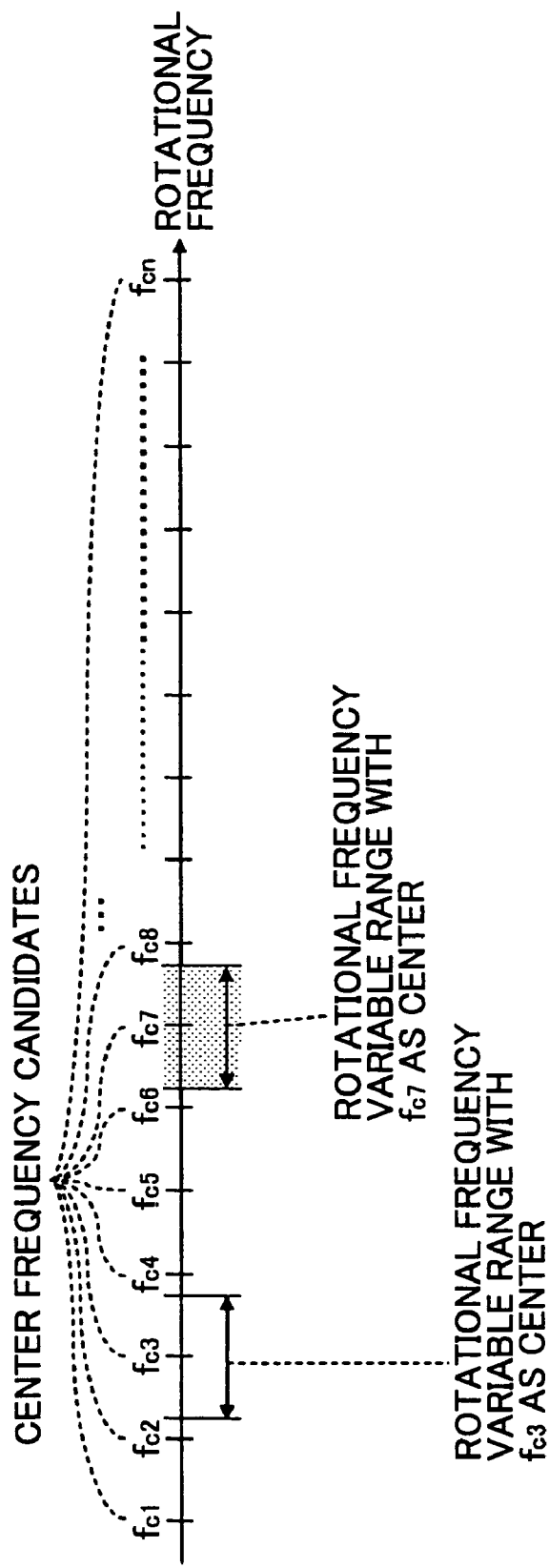
FIG. 22 is a diagram for explaining the variable range of the rotational frequency in the ninth embodiment.

To solve this problem, in the present embodiment, a variable range of the rotational frequency is set as shown in FIG. 22.

FIG. 22 is a diagram for explaining the variable range of the rotational frequency in the present embodiment.

As shown in FIG. 22, the rotational frequency controller 15 may change the signal rotational frequency of the signal phase rotators 22 and 32 in a frequency range having a specified width around the center frequency specified by the control signal. The frequency difference detector 51 may search for a rotational frequency that minimizes the frequency offset detected by the frequency offset detector 61 so as to detect the frequency difference between the frequency of the received signals and the detection reference frequency. The specific procedure may be the same as those shown in FIG. 5 to FIG. 7 in the fourth embodiment.

According to the present embodiment, it is possible to detect the frequency difference at a high speed with high precision.

In the present embodiment, it is exemplified that the frequency difference detector 51 searches for a rotational frequency that minimizes the frequency offsets. But methods shown in FIG. 7, FIG. 9, and FIG. 19 may also be used to search a rotational frequency that minimizes a mean square error between the received signal replica and the received signal.

In addition, in the present embodiment, it is exemplified that the information of the center frequencies in the control signals indicates the center frequencies themselves. But the information of the center frequencies may be the data specifying the index of frequencies in the list stored in the frequency storage unit 81 provided as illustrated in FIG. 15.

10th Embodiment

Figure 23:
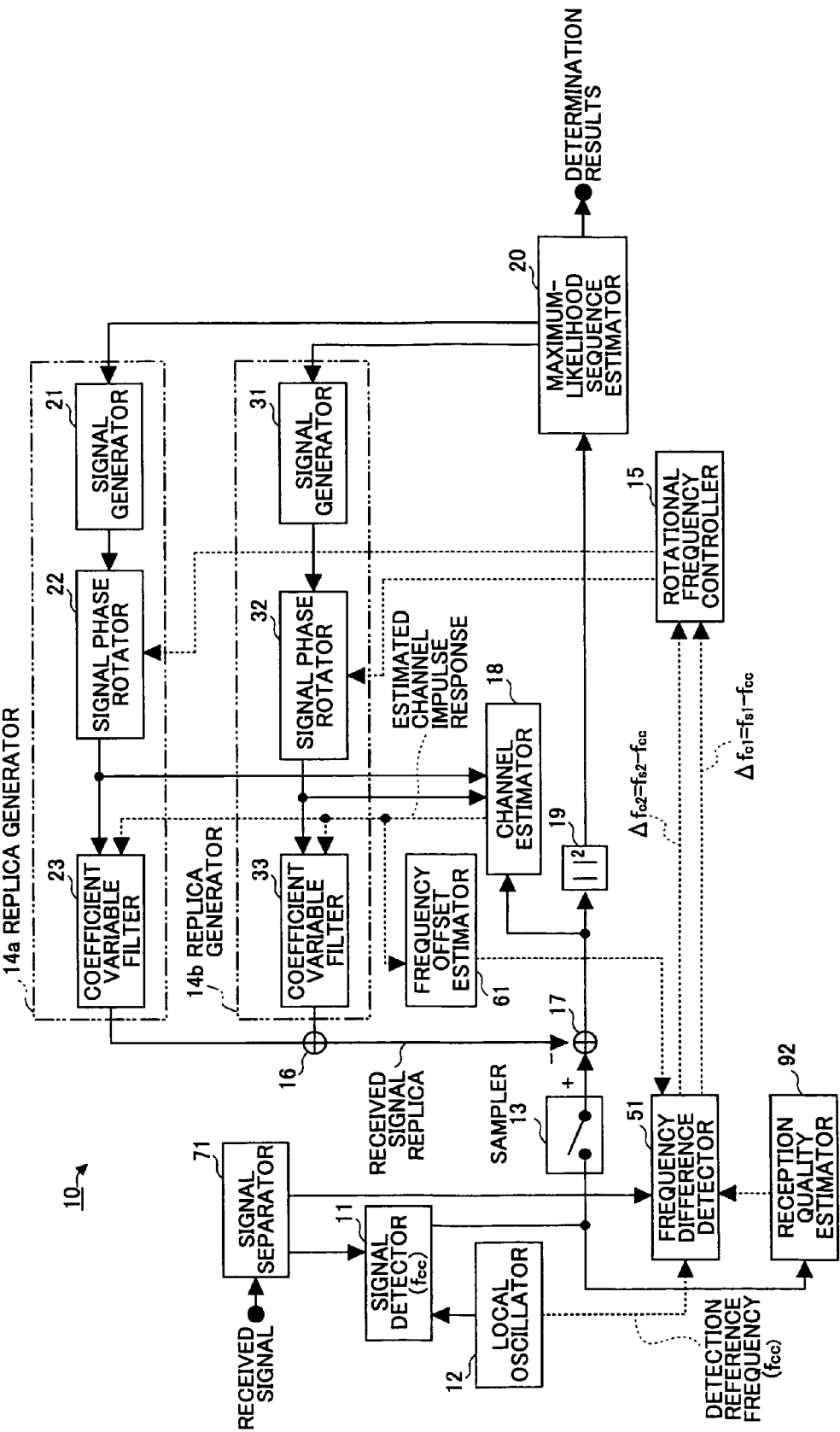
FIG. 23 is a block diagram showing a configuration of a signal reception device 10 according to a 10th embodiment of the present invention.

FIG. 23 is a block diagram showing a configuration of a signal reception device 10 according to a 10th embodiment of the present invention.

Compared to the signal reception device 9 in FIG. 21, the signal reception device 10 of the present embodiment includes a reception quality estimator 92 in addition to the configuration of the signal reception device 9 in FIG. 21, and except for the reception quality estimator 92, the operations of the signal reception device 10 are the same as the signal reception device 9 in FIG. 21.

Below, the same reference numbers are assigned to the same elements as those illustrated in FIG. 21, and overlapping descriptions are omitted.

As illustrated in FIG. 23, received data signals are input to the reception quality estimator 92 via the signal separator 71 and the signal detector 11. The reception quality estimator 92 compares the quality of signals in the received signal, and outputs the results to the frequency difference detector 51.

For example, the reception quality may be SNR (Signal-to-Noise Ratio), CNR (Carrier-to-Noise Ratio), reception power, SIR (Signal-to-Interference Ratio), or CIR (Carrier-to-Interference Ratio).

Figure 24:
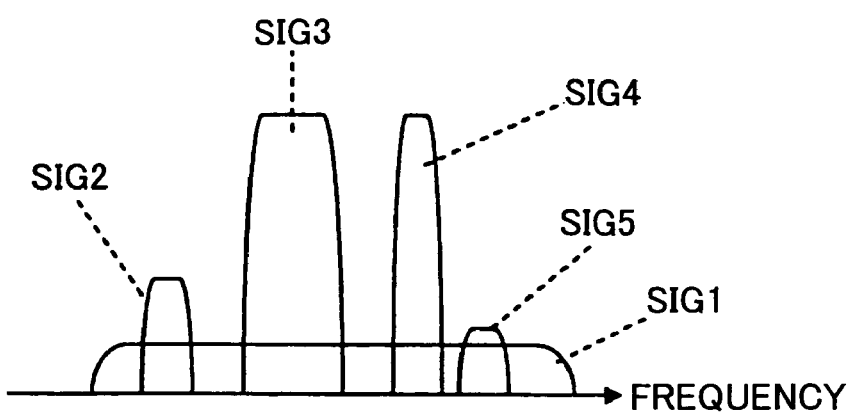
FIG. 24 is a diagram illustrating a state in which plural signals are transmitted with a frequency band being partially or totally shared in the 10th embodiment.
Figure 25:
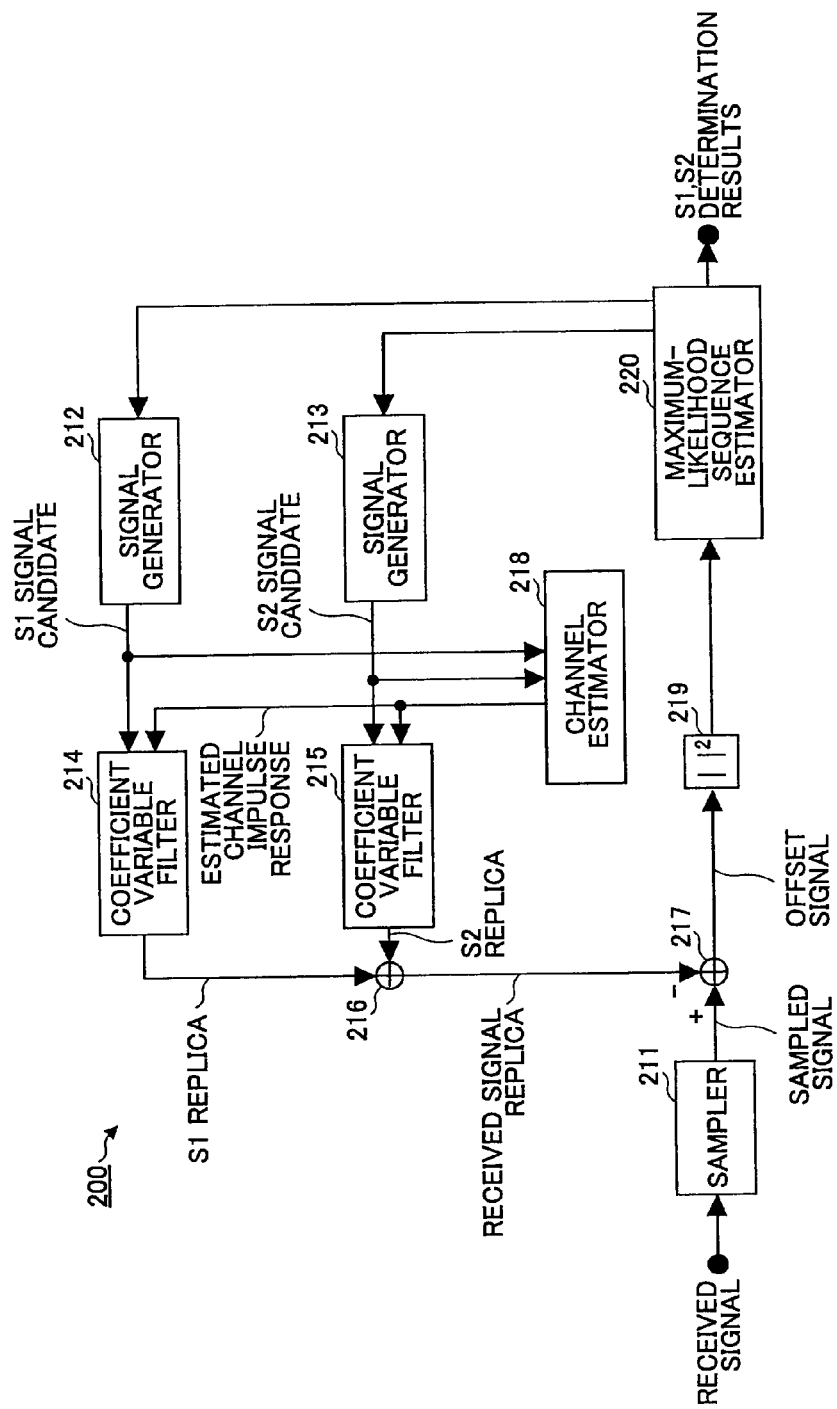
FIG. 25 is a block diagram illustrating an example of a configuration of an interference canceller of the related art.

FIG. 24 is a diagram illustrating a state in which plural signals are transmitted with a frequency band being partially or totally shared.

As illustrated in FIG. 24, five signals (SIG1 through SIG5) are considered. The reception power of these signals SIG1 through SIG5 (P1 through P5) satisfies the following relation:

$$P3 > P1 > P4 > P2 > P5.$$

In the present embodiment, the reception quality estimator 92 inputs the order of these reception power levels P1 through P5 to the frequency difference detector 51. The order of the reception power levels P1 through P5 may be obtained by comparing the reception power levels P1 through P5. Alternatively, each of the transmission devices may send known symbol sequences to their own destination reception device, and the reception devices may calculate the correlation by using the known symbol sequences, thereby determining the order of the power levels.

In the present embodiment, the reception quality estimator 92 determines the rotational frequency in the signal phase rotators 22 and 32 sequentially in order from the signal having high reception quality to the signal having low reception quality, while these signals are transmitted with a frequency band being partially or totally shared. As a result, it is possible to precisely detect the frequency differences among plural signals included in the received signal, and precisely generate replicas and separate the signals in the received signal.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

In the above embodiments, it is exemplified that transmission devices and reception devices operate in a single carrier transmission scheme, but the present invention is not limited to this transmission scheme. For example, the present invention is applicable to transmission devices and reception devices operate in a multi-carrier transmission scheme. In this case, it is sufficient to provide a number of the replica generation circuits equaling the number of the sub-carriers.

In the above embodiments, it is exemplified that the received signal replica is generated while considering differences of center frequencies of signals included in the received signals, and the received signal replica can be generated by considering the differences of carrier frequencies.

In the above embodiments, it is exemplified that the information of center frequencies is included in control signals generated by the transmission devices, but the present invention is not limited to this. For example, instead of information of center frequencies, the control signals may include carrier frequencies having identifiable center frequencies or channel information.

The transmission devices and reception devices can be provided in wireless communication apparatuses in a mobile communication system, for example, in a wireless base station apparatus or a wireless terminal device.

This patent application is based on Japanese Priority Patent Application No. 2004-128832 filed on Apr. 23, 2004, the entire contents of which are hereby incorporated by reference.

What is claimed is:

1. A signal reception device, comprising:
an interference suppression unit configured to generate replicas of plural signals in a received signal and separate the signals by suppressing interference signals, wherein the interference suppression unit includes
a signal phase rotator configured to rotate phases of the signals in the received signal at predetermined respective rotational frequencies, said predetermined rotational frequencies being related to respective frequencies of the received signals,
a rotational frequency controller configured to set the predetermined rotational frequencies, and control the predetermined rotational frequencies so as to be equal to the frequency differences detected by the frequency difference detector,
a replica generator configured to generate the replicas of the signals in the received signal by using the phase-rotated signal candidates rotated by the signal phase rotator, and
a frequency difference detector configured to detect frequency differences between center frequencies of the signals in the received signal and a detection reference frequency.

2. The signal reception device as claimed in claim 1, wherein
the interference suppression unit further includes
a channel estimator configured to estimate the channel impulse responses of the signals in the received signal; and
a frequency offset estimator configured to estimate frequency offsets between the predetermined rotational frequencies and the frequency differences.

3. The signal reception device as claimed in claim 2, wherein the frequency difference detector adjusts the frequency differences detected by the frequency difference detector so that the mean square values of the frequency offsets becomes a predetermined value.

4. The signal reception device as claimed in claim 2, wherein
the rotational frequency controller changes the rotational frequencies; and
the frequency difference detector detects the frequency differences by searching for rotational frequencies that cause the frequency offsets to be a predetermined value.

5. The signal reception device as claimed in claim 2, wherein
the interference suppression unit further includes
a frequency information storage unit configured to store values of the center frequencies to be used by signal transmission devices;
the frequency information storage unit selects one of the stored values of the center frequencies; and
the frequency difference detector calculates a frequency difference between the selected value of the stored center frequencies and the detection reference frequency.

6. The signal reception device as claimed in claim 5, wherein
the interference suppression unit further includes
a rotation speed detector configured to detect the phase rotation speed of the estimated channel impulse responses of the signals in the received signal; and
the frequency information storage unit selects the selected value of the center frequencies again when the rotation speed is higher than a predetermined value.

7. The signal reception device as claimed in claim 6, wherein the frequency information storage unit selects the selected value of the center frequencies again depending on whether the detected rotation speed is positive or negative.

8. The signal reception device as claimed in claim 2, wherein
the interference suppression unit further includes
a reception quality estimator configured to estimate the reception quality of the signals in the received signal; and
the frequency difference detector sequentially detects the frequency differences between the center frequencies and the detection reference frequency based on the estimated reception quality of each signal in the received signal.

9. The signal reception device as claimed in claim 1, wherein
the rotational frequency controller changes the rotational frequencies; and
the frequency difference detector detects the frequency differences by searching for the rotational frequencies that causes a mean square value of the residual signal, which is obtained by subtracting the replica signals generated by the replica generators from the received signal, to be a predetermined value.

10. The signal reception device as claimed in claim 1, wherein
the interference suppression unit further includes
a signal separator configured to separate a received signal into a data signal and the information of the center frequencies or the carrier frequencies of signals transmitted from signal transmission devices, and extract the information of the center frequencies; and
the frequency difference detector detects the information of the center frequencies or the carrier frequencies separated by the signal separator, and calculates frequency differences between the center frequencies or the carrier frequencies and the detection reference frequency.

11. The signal reception device as claimed in claim 1, wherein
the frequency difference detector extracts the information of the center frequencies or carrier frequencies of signals transmitted from signal transmission devices, and detects frequency differences between the center frequencies or the carrier frequencies and the detection reference frequency when varying the rotational frequencies in a predetermined range around the center frequency or the carrier frequency.

12. A signal transmission device, comprising:
a frequency information generation unit configured to generate information of the center frequency or the carrier frequency of a transmission signal; and
a frequency information transmission unit configured to include the generated information of the center frequency or the carrier frequency in a predetermined signal, and transmit the predetermined signal to a signal reception device that includes
a frequency difference detector configured to detect frequency differences between center frequencies of the signals in the received signal and a detection reference frequency, and
a rotational frequency controller configured to control the predetermined rotational frequencies so as to be equal to the frequency differences detected by the frequency difference detector.

13. The signal transmission device as claimed in claim 12, wherein the predetermined signal is transmitted through channels common to the signal transmission device and other signal transmission devices, said signal transmission device and other signal transmission devices sharing a part of or the whole frequency band.

14. A wireless communication system, comprising:
a plurality of signal transmission devices; and
a plurality of signal reception devices communicating with the signal transmission devices; wherein
the signal transmission devices generate predetermined signals including the information of the center frequencies or the carrier frequencies of each signal, and transmit the predetermined signals;
each of the signal reception devices includes an interference suppression unit configured to generate replicas of plural signals in the received signal and separate the signals by suppressing interference signals;
the interference suppression unit includes a replica generator configured to generate replicas of the signal in the received signal by using the center frequencies or carrier frequencies, whose information is extracted from the predetermined signal, a frequency difference detector configured to detect frequency differences between center frequencies of the signals in the received signal and a detection reference frequency, and a rotational frequency controller configured to control the predetermined rotational frequencies so as to be equal to the frequency differences detected by the frequency difference detector; and
the signal reception devices separate the signals in the received signal by using the replica signal generated by the replica generator.

15. A signal reception method for suppressing interference signals by generating replica of the signals in the received signal and separating the signals when demodulating the received signal, said method comprising the steps of:
rotating the phases of signal candidates at the predetermined rotational frequencies, said predetermined rotational frequencies being related to respective center frequencies or carrier frequencies of the signals in the received signal;
detecting frequency differences between center frequencies of the signals in the received signal and a detection reference frequency:
controlling the predetermined rotational frequencies so as to be eciual to the frequency differences detected by the frequency difference detector;
generating the replica signals by using the phase-rotated signal candidates; and
separating the signals in the received signal using the generated replica signals.

* * * * *